(12) United States Patent
Naruse et al.

(10) Patent No.: US 7,934,750 B2
(45) Date of Patent: May 3, 2011

(54) AIRBAG

(75) Inventors: Motoaki Naruse, Aichi-ken (JP); Hiroyuki Kobayashi, Aichi-ken (JP); Masamichi Kajiro, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 134 days.

(21) Appl. No.: 12/382,436

(22) Filed: Mar. 17, 2009

(65) Prior Publication Data

US 2009/0236830 A1 Sep. 24, 2009

(30) Foreign Application Priority Data

Mar. 24, 2008 (JP) .................................. 2008-076468

(51) Int. Cl.
*B60R 21/16* (2006.01)
(52) U.S. Cl. .................... 280/743.1; 280/731; 280/728.2
(58) Field of Classification Search ............... 280/743.1, 280/728.2, 731
See application file for complete search history.

(56) References Cited

U.S. PATENT DOCUMENTS

| 5,707,711 A * | 1/1998 | Kitamura ....................... 428/193 |
| 2005/0023809 A1 * | 2/2005 | Yamamoto et al. ............ 280/731 |

FOREIGN PATENT DOCUMENTS

| EP | 0 485 599 A1 * | 5/1990 |
| JP | A-8-104194 | 4/1996 |
| JP | 9-156440 A * | 6/1997 |
| JP | 9-164890 A * | 6/1997 |
| JP | 10-35383 A * | 2/1998 |
| JP | A-10-129380 | 5/1998 |

* cited by examiner

*Primary Examiner* — Ruth Ilan
(74) *Attorney, Agent, or Firm* — Posz Law Group, PLC

(57) ABSTRACT

An airbag includes on an area of a circumferential wall encircling mounting holes a reinforced area that has a laminated structure of base cloths, i.e. a body cloth and a plurality of reinforcing cloths overlaid on the body cloth. Each of the base cloths has an adhesive layer on one surface and, the reinforced area includes in between the base cloths an adhesion area that bonds the base cloths together by heat sealing. The adhesion area is formed between two of the base cloths immediately adjoining each other or between two of the base cloths that has at least one other base cloth placed in between and at an area of the other base cloth where there is no cloth. All the base cloths are bonded together by the adhesion area without slippage from one another in a direction orthogonal to a layering direction of the base cloths.

12 Claims, 17 Drawing Sheets

AIRBAG

The present application claims priority from Japanese Patent Application No. 2008-076468 of Naruse et al., filed on Mar. 24, 2008, the disclosure of which is hereby incorporated into the present application by reference.

BACKGROUND OF THE INVENTION

1. Field of the Invention

The present invention relates to an airbag inflatable with inflation gas.

2. Description of Related Art

JP8-104194 discloses an airbag that includes on an area exposed to heat and pressure of inflation gas and provided with a plurality of mounting holes used to mount the airbag to a predetermined location a laminated area where more than one base cloths for forming the bag overlap for enhancing tensile strength.

The laminated area is provided for reinforcement by bonding one or more sheets of small reinforcing cloth to a body cloth that forms a bag-shaped circumferential wall. Those base cloths are made of fabric woven by multifilament yarns of synthetic fiber such as polyamide, polyester, and the base cloths are bonded together by an adhesive so manufacturers can manufacture airbags easily.

The bonding is conducted either by preparing base cloths having an adhesive layer on one surface, placing two of the base cloths so their adhesive layers butt each other and heating the base cloths under pressure by heat press or the like so the adhesive layers weld together to join the cloths together, or by applying an adhesive between two of the base cloths and bonding the cloths together by heat press or the like.

JP10-129380 discloses an airbag that is formed by bonding outer peripheral edges of base cloths by an adhesive.

However, the latter method that applies an adhesive between two base cloths and bonds the cloths together not only tends to increase an amount of the adhesive used but also takes a painful process of applying the adhesive to every airbag right before the bonding work. It further requires such a process as resolidification, and therefore is not efficient. Accordingly, the former method, i.e. the method of bonding two base cloths preliminarily provided with adhesive layers by heat press or the like, is preferred in the light of reducing the amount of adhesive and process improvement.

However, in such an instance of attaching more than one reinforcing cloths to the body cloth, i.e. in such an instance of overlapping three or more sheets of base cloths on an area to be reinforced, the above method of using base cloths that are preliminarily provided on one surface with an adhesive layer does not work in positioning a third and subsequent cloths. Specifically, it is difficult to bond three or more base cloths together while securing a tensile strength and good handleability and avoiding a slippage of the cloths to a direction orthogonal to a layering (laminating) direction of the cloths. Slippage of two or more sheets of reinforcing cloths in a direction orthogonal to the layering direction will make it difficult to insert mounting means into mounting holes and thus reducing work efficiency.

SUMMARY OF THE INVENTION

The object of the present invention is to provide an airbag that is readily manufactured and secures a good handleability while including a reinforced area on a circumferential wall that has a laminated structure of three or more sheets of base cloths.

The airbag of the invention includes a reinforced area for enhancing tensile strength on a circumferential wall of the airbag. The reinforced area is formed in a periphery of mounting holes for receiving means for mounting the airbag on a predetermined mounting location. The reinforced area has a laminated structure of base cloths each of which having a layer of adhesive on one surface and includes in between the base cloths an adhesion area that bonds the base cloths together by heat sealing. The base cloths includes a body cloth and at least two reinforcing cloths each of which having a smaller area than the body cloth. The adhesion area is formed between two of the base cloths immediately adjoining each other or between two of the base cloths that has at least one other base cloth placed in between and at an area of the other base cloth where there is no cloth, namely a no-cloth area. All the base cloths are bonded together by the adhesion area without slippage from one another in a direction orthogonal to a layering direction of the base cloths.

In the thus configured airbag, all the base cloths forming the laminated structure are bonded to one another by the adhesion area formed between the two base cloths immediately adjoining each other and/or the adhesion area formed between the two base cloths that has the other base cloth placed in between and at the no-cloth area of the other base cloth, or alternatively only by the latter adhesion area. This configuration prevents all the reinforcing cloths from slipping in a direction orthogonal to the layering direction and further makes it easy to insert the mounting means into the mounting holes, thus improving handleability of the airbag.

Moreover, since the body cloth and all the reinforcing cloths are bonded together without slippage, in other words all the reinforcing cloths are directly or indirectly bonded to the body cloth, even in the event that a tension force acts on the body cloth at inflation of the airbag, the tension force will be distributed among the reinforcing cloths, and thus enhancing the tensile strength of the body cloth.

At the bonding work during manufacturing of the airbag, although the base cloths have adhesive layers only on one surface, all the base cloths are directly or indirectly bonded together without sewing or the like by heat sealing the adhesive layers of the two base cloths immediately adjoining each other and/or heat sealing the adhesive layers of the two base cloths that has the other base cloth placed in between, via the no-cloth area of the other base cloth.

Furthermore, the mounting holes can be formed on the reinforced area by laser cutting or the like after bonding all the base cloths at the adhesion area. Since the base cloths are bonded together so as not to slip from one another, the mounting holes are formed smoothly at the desired positions.

Therefore, although including the reinforced area that has a laminated structure of three or more sheets of the base cloths, the airbag of the invention is readily manufactured and secures a good handleability.

The no-cloth area may be comprised of a through hole (can also be referred to as an inner space) formed on the other base cloth placed between the two base cloths adhered together. Alternatively, the no-cloth area may be comprised of an outer space of the other base cloth that is formed by making the other base cloth smaller than the two base cloths such that the adhesion area of the two base cloths is formed on the outer space of the other base cloth.

The reinforcing cloths may be located on an inner surface of the body cloth, and alternatively at least one of the reinforcing cloths may be located on an outer surface of the body cloth. However, with the former configuration, two or more sheets of the reinforcing cloths located inside the body cloth will protect the inner surface of the body cloth from hot mists or residual of inflation gas, i.e. improve the heat resistance of the body cloth.

It is desired that one of the reinforcing cloths acts as a first reinforcing cloth that is directly adhered to the body cloth by annular adhesion areas that are formed all around and immediately around the mounting holes.

With this configuration, the first reinforcing cloth is bonded to the body cloth in such a manner as to double the base cloths in- the circumferences of the mounting holes for reinforcement, and enhances tensile strength of the circumferences of the mounting holes including the annular adhesion areas and causes no raveling or tear in the circumferences even in the event that a tension force acts on those areas in accordance with airbag inflation, thus allowing a smooth inflation of the airbag When forming such annular reinforced areas around the mounting holes, the body cloth and the first reinforcing cloth may be so adjacent that their whole opposing planes thereof contact each other. Alternatively, at least one other sheet out of the remaining reinforcing cloths, namely a second reinforcing cloth, may be located between the body cloth and the first reinforcing cloth. The latter case will be arranged by providing through holes acting as the no-cloth areas on the second reinforcing cloth in such a manner as to enlarge the circumferences of the mounting holes so the body cloth and first reinforcing cloth are directly bonded together by annular adhesion areas formed on the no-cloth areas.

If the adhesive is made from polyamide elastomer and the base cloths are made of fabric of polyamide fiber, the airbag will be recyclable as a whole as polyamide material although the base cloths are coated with the adhesive.

The base cloths may be coated by a coating agent for reducing gas permeability which is made from the same material as the adhesive. Such coated base cloths will improve air-tightness of the airbag without inhibiting recyclability. Utilizing this configuration, the base cloths may be manufactured by firstly forming an elongative and continuous band-shaped base cloth material coated by the coating agent by printing technique such as transfer roll, spray coating, brush coating or the like, and then cutting the base cloths out of the material in predetermined shapes. Since the base cloths are preliminarily coated with the adhesive, a separate application of the adhesive on the adhesion area can be omitted or simplified, and thus facilitating the manufacturing of the airbag.

It will also be appreciated that the reinforced area includes an inlet port of inflation gas and the mounting holes are arranged radially about and in a periphery of the inlet port inside the reinforced area, and that, in a view projected along the layering direction of the base cloths, the adhesion area of the base cloths is located on a position on the reinforced area that an annular retainer including the means for mounting to be inserted into the mounting holes holds down onto the predetermined mounting location. With this configuration, since the retainer holds down the stiff adhesion area directly onto the predetermined mounting location, the base cloths on the adhesion area are coupled in a monolithic manner, thus enhancing the bond strength of the body cloth and the reinforcing cloths and further enhancing tensile strength that counteracts the tension force actable on the body cloth.

Moreover, if the adhesion area of the base cloths is located avoiding locations of creases that are formed to fold up the airbag, the airbag is folded up into a compact configuration since the bulky adhered area is not folded.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
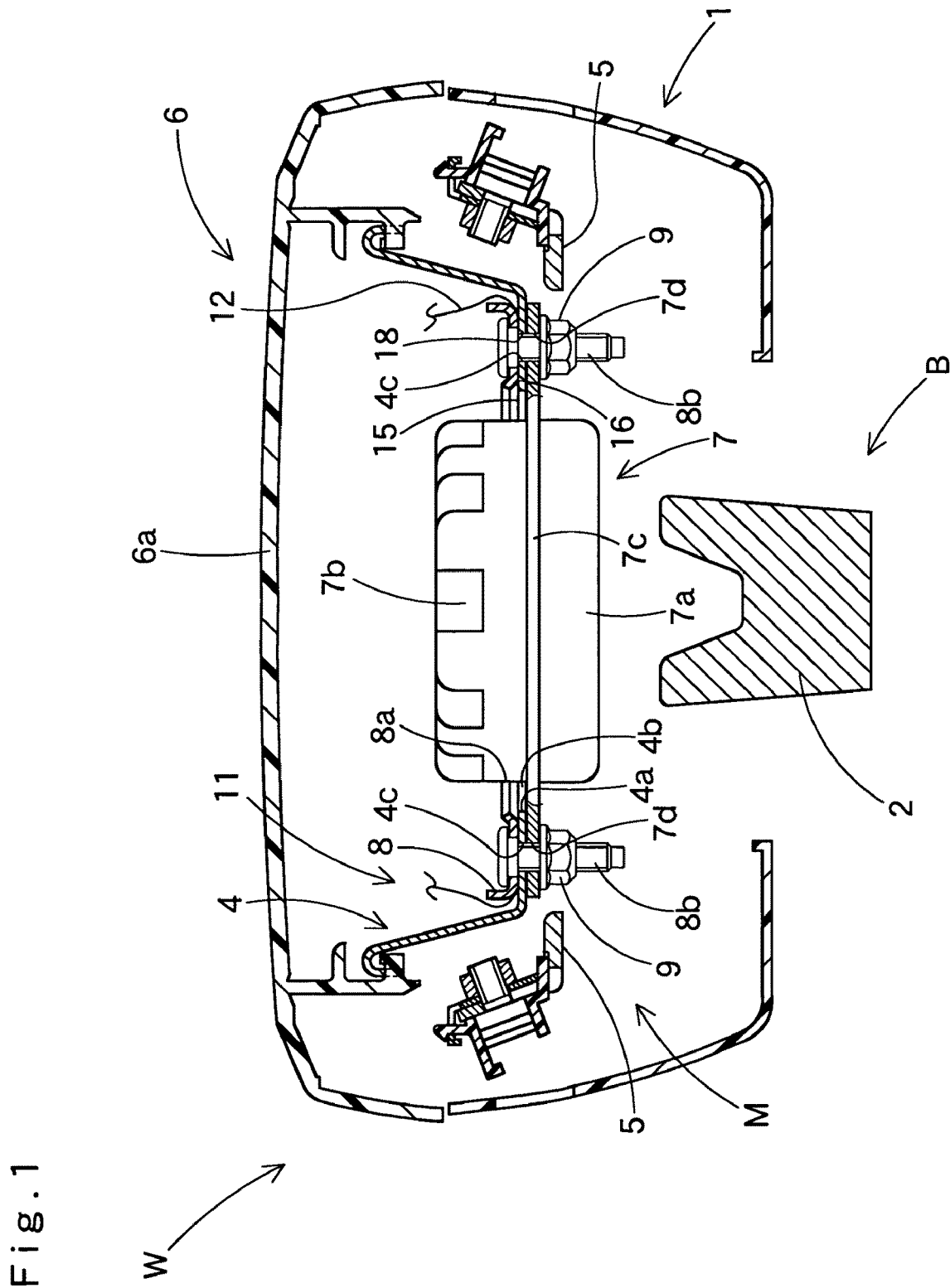
FIG. 1 is a sectional view of an airbag apparatus for a driver's seat that employs an airbag according to the first embodiment of the present invention.

As shown in FIG. 1, an airbag 11 according to the first embodiment of the invention is now described for illustrative purpose as is used in an airbag apparatus M for a driver's seat mounted on a boss area B located at the center of a steering wheel W.

The airbag apparatus M includes the airbag 11, which is folded up, an inflator 7 for supplying the airbag 11 with inflation gas, a case 4 that is made of sheet metal and houses the airbag 11 and inflator 7, an airbag cover 6 of synthetic resin that is attached to the case 4 and covers the airbag 11 from above and a retainer 8 for attaching the airbag 11 and inflator 7 to the case 4. The airbag cover 6 is designed to open up a door 6a when pushed by the airbag 11 and allow the airbag 11 to deploy therefrom.

The case 4 is connected on the underside of a bottom wall 4a with a base plate 5 of a horn switch mechanism, and which base plate 5 is secured to a core 2 of a body 1 of the steering wheel W. Thus the airbag apparatus M is mounted on the boss area B of the steering wheel W with the base plate 5. The bottom wall 4a is provided with a circular insert hole 4b that runs through in a vertical direction and through holes 4c formed at four positions around the insert hole 4b. The insert hole 4b is to receive an inflator body 7a from lower side and the through holes 4c are to receive bolts 8a of the retainer 8 for attaching the airbag 11 and inflator 7 to the bottom wall 4a of the case 4.

That is, the bottom wall 4a of the case 4 acts as a mounting location of the airbag 11 whereas the bolts 8a of the retainer 8 serve as means for mounting the airbag 11 to the mounting location.

The inflator 7 includes a generally columnar body 7a and a flange 7c that projects in a generally square annular fashion from a central area in a vertical direction of the body 7a. The body 7a is provided on the outer circumference of the top area with gas discharge ports 7b. The flange 7c includes through holes 7d used to mount the inflator 7 to the case 4.

The retainer 8 is made of sheet metal and is square annular in shape. It includes at the center a circular insert hole 8a and is provided at four corners with bolts 8a projecting downward. The retainer 8 is housed inside the airbag 11 and holds a region 16 around a later-described inlet port 15 of the airbag 11. The bolts 8a of the retainer 8 are put through the mounting holes 18 of the airbag 11, through holes 4c of the bottom wall 4a of the case 4 and the mounting holes 7d of the inflator 7. By fastening the bolts 8a with nuts 9, the retainer 8 mounts the airbag 11 and inflator 7 to the bottom wall 4a of the case 4.

Figure 2:
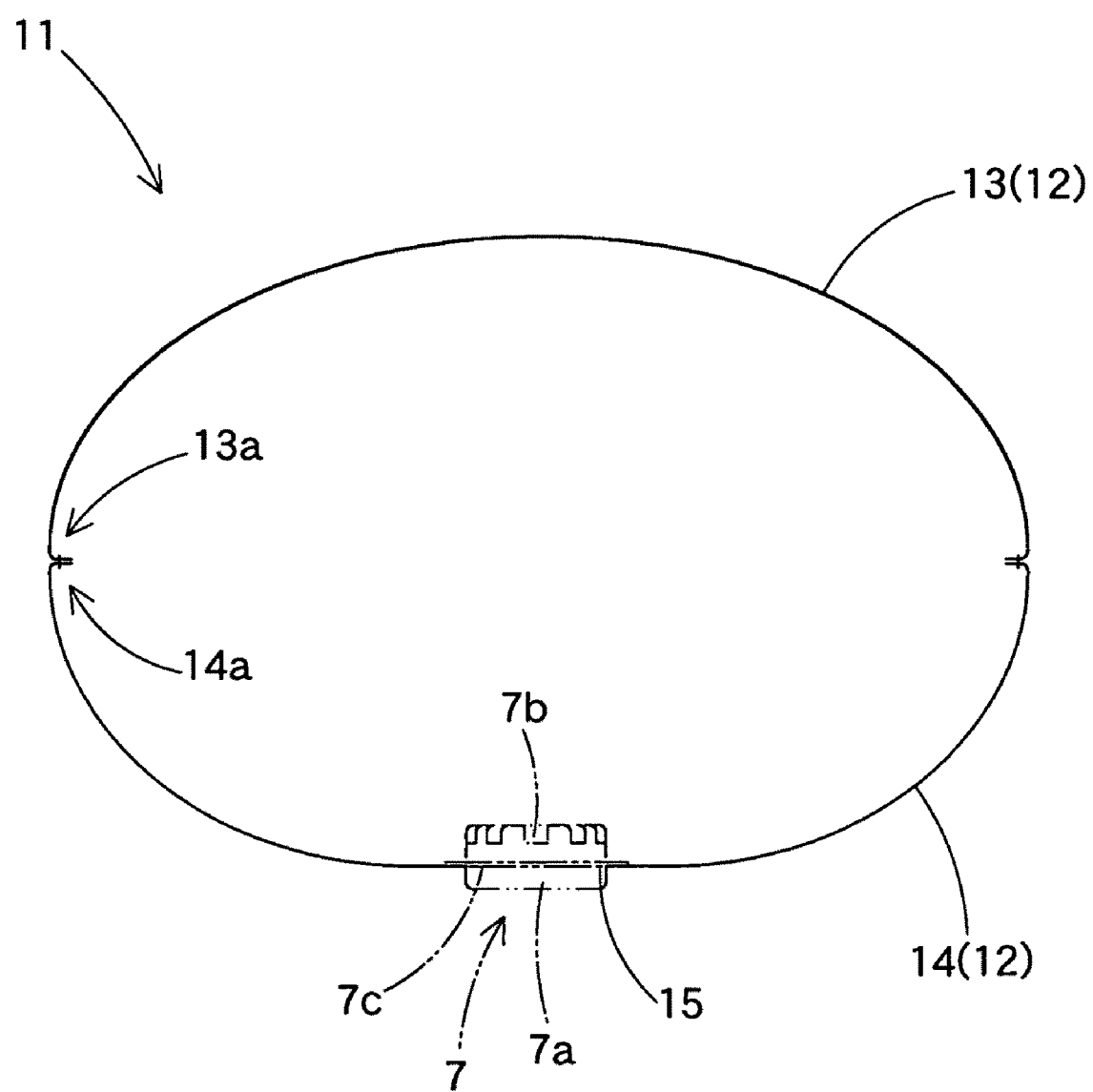
FIG. 2 is a schematic vertical section of the airbag of the first embodiment inflated by itself.

As shown in FIG. 2, the airbag 11 is inflatable into a generally elliptic sphere. The circumferential wall 12 of the airbag 11 includes a restraint panel 13 deployable upward and toward a driver and a mount-side panel 14 deployable downward and toward the steering wheel body 1. The panels 13 and 14 have identical discoid contours and are coupled by outer peripheral edges 13a and 14a, and thus forming the circumferential wall 12 of the airbag 11.

Figure 3:
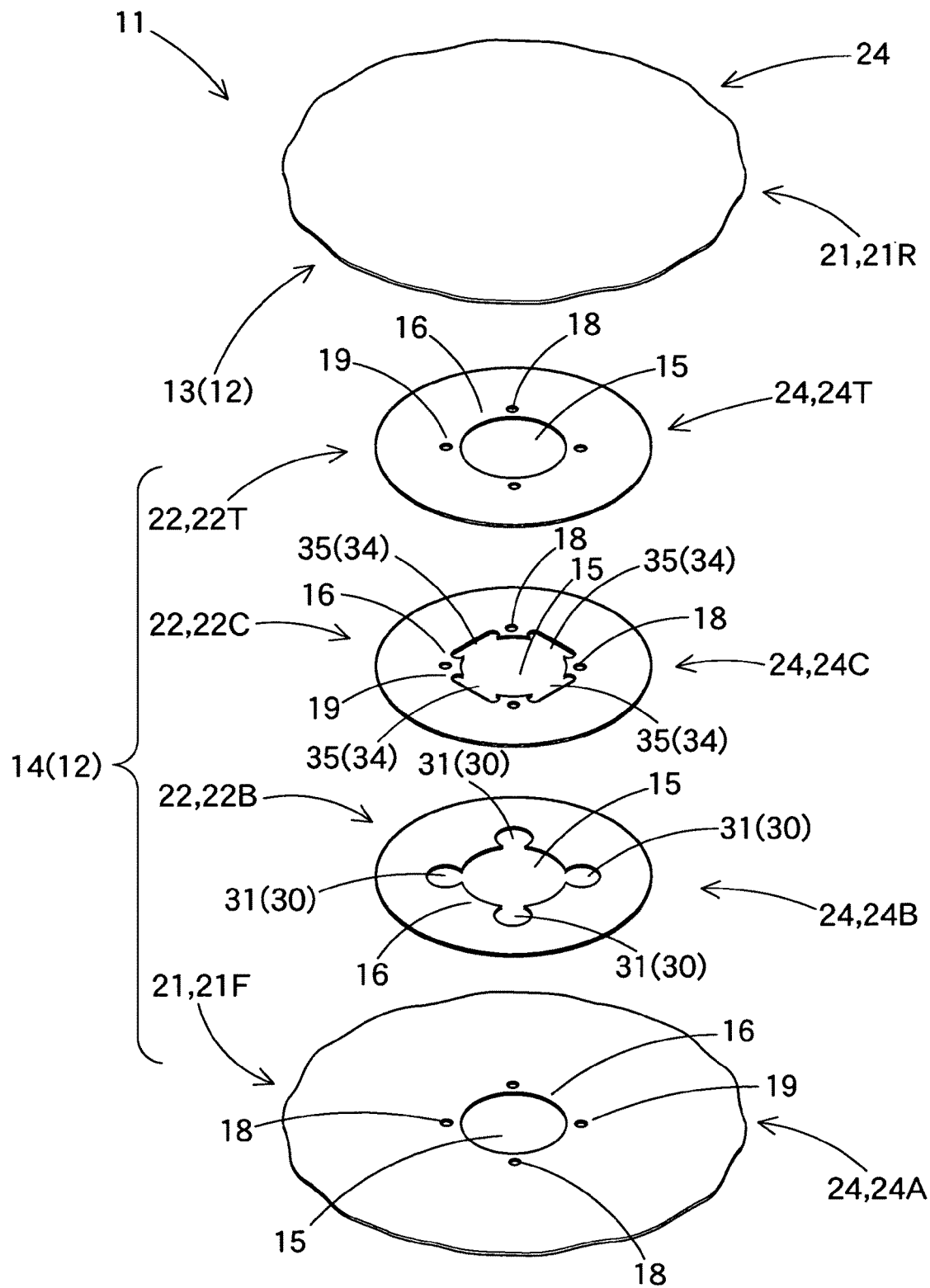
FIG. 3 is a partial enlarged exploded perspective view of components of the airbag of FIG. 2.
Figure 8:
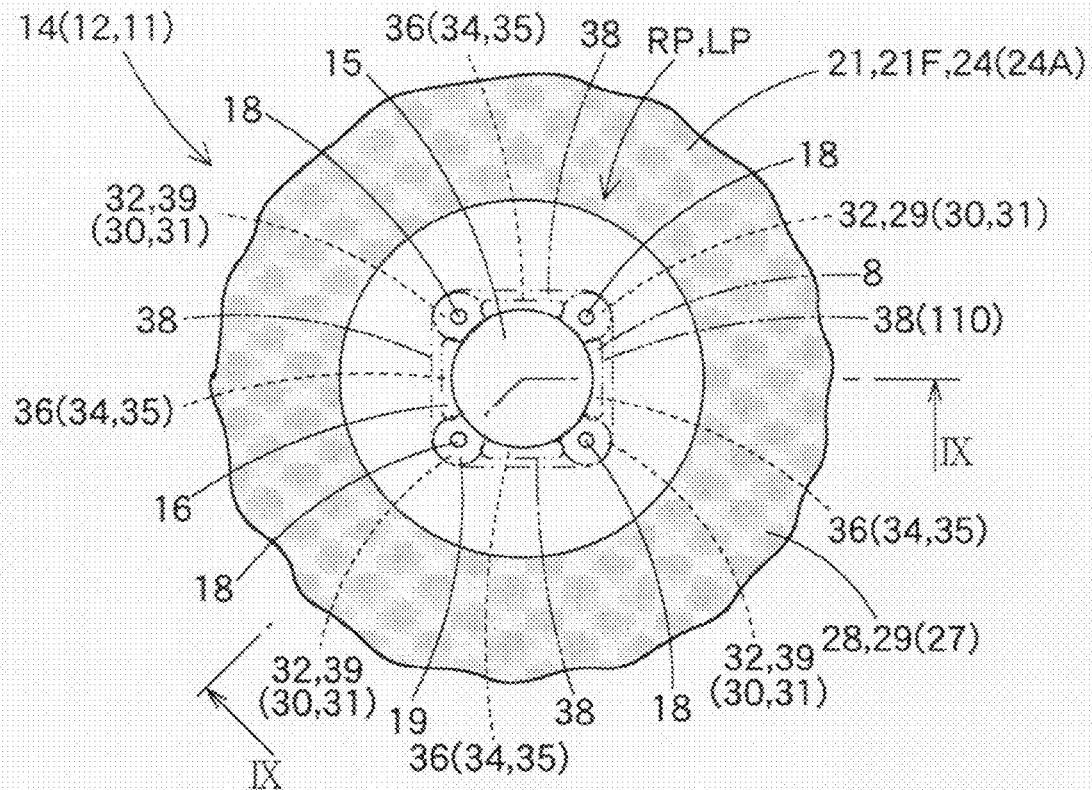
FIG. 8 is a partial enlarged plan view of a vicinity of an inlet port of the airbag of FIG. 2.

As shown in FIGS. 3 and 8, the mount-side panel 14 includes at the center a round inlet port 15 for receiving the inflator body 7a from lower side. In the peripheral region 16 of the inlet port 15 are mounting holes 18 for receiving the bolts 8b of the retainer 8 that attaches the airbag 11 to the bottom wall 4a of the case 4.

The peripheral region 16 of the inlet port 15 forms a laminated area LP (FIGS. 8 and 9), which also acts as a reinforced area RP that conduces to enhance tensile strength, where three or more sheets of base cloths 24 are bonded together in layers. As shown in FIG. 3, the base cloths 24 (24A, 24B, 24C and 24T) of the illustrated embodiment are comprised of a sheet of body cloth 21 (21F) that is round in shape and forms a whole area of the mount-side panel 14 and plural (three, in the illustrated embodiment) sheets of reinforcing cloths 22 (22B, 22C and 22T) that are round as well and smaller than the body cloth 21 in area.

Figure 9:
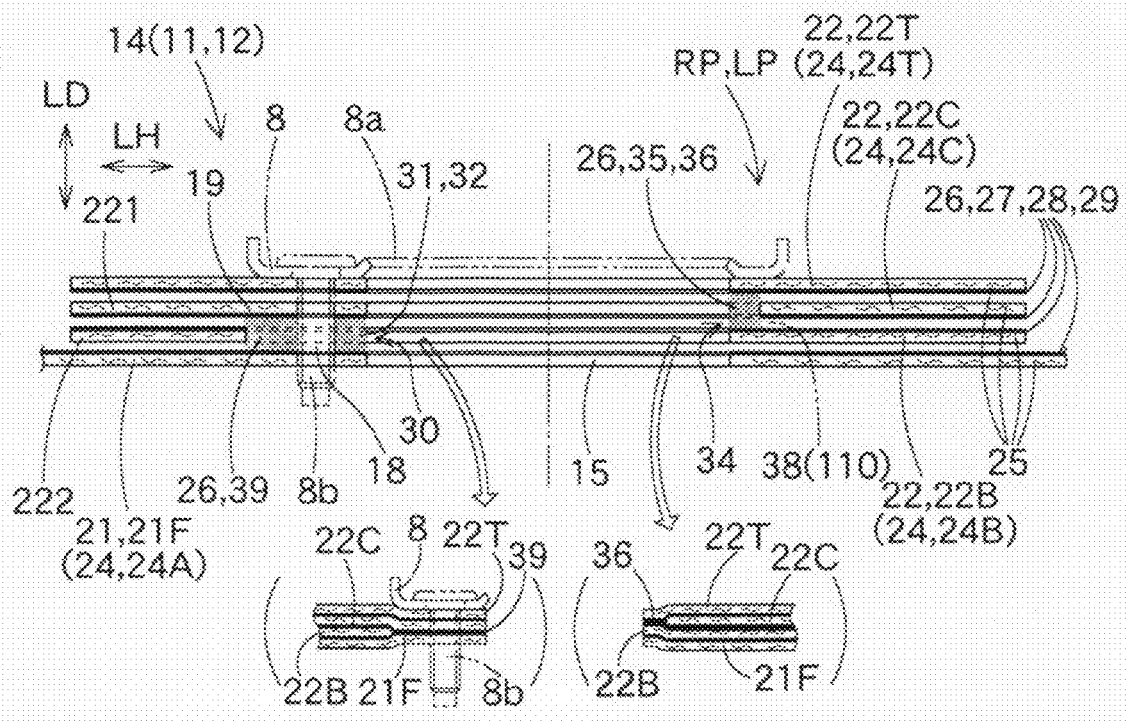
FIG. 9 is a vertical section taken along line IX-IX of FIG. 8.

The base cloths 24 that form the laminated area LP is made of fabric 25 that has an adhesive layer 26 of an adhesive 27 on one surface (FIG. 9). The fabric 25 that this specific embodiment employs is a plain-weave fabric of polyamide yarn. Polyamide elastomer is used as the adhesive 27 because it is heat-sealable, does not inhibit flexibility of the fabric 25, can form a coating layer 29 for improving impermeability, and further is recyclable together with the fabric 25.

More specifically, the fabric 25 used in this embodiment is a plain weave of nylon 66 multiple wound yarn with fineness of 350 dtex (315 denier), at density of 59 yarns/inch (warp) and 59 yarns/inch (weft), cover factor $(K)=59\times(315)^{0.5}+59\times(315)^{0.5}=2094$. Polyether block polyamide is employed as the polyamide elastomer (PA elastomer) used for the adhesive 27. The adhesive 27 is applied to the fabric 25 in the form of dispersion liquid or emulsion, utilizing printing technique such as a transfer roll, and the fabric 25 is then subjected to drying under 175° C. for 2 minutes and thus forming the adhesive layer 26 or coating layer 29. In this specific embodiment, the coating amount of the adhesive 27 is 12.5 gm$^{-2}$. The adhesive 27 is applied on an entire area or only predetermined areas of one surface of the fabric 25 to form a base cloth material having the adhesive layer 26 or coating layer 29, for example like a band-shaped base cloth material 23 shown in FIG. 10, and the body cloths 21 and reinforcing cloths 22 are cut out from the material 23.

The airbag 11 of the first embodiment is formed of a pair of body cloths 21 (21F, 21R) and three sheets of reinforcing cloths 22 (22B, 22C and 22T.) The body cloth 21R forms the restraint panel 13 whereas the other body cloth 21F forms the mount-side panel 14 to which the reinforcing cloths 22 (22B, 22C and 22T) are bonded.

Figure 5:
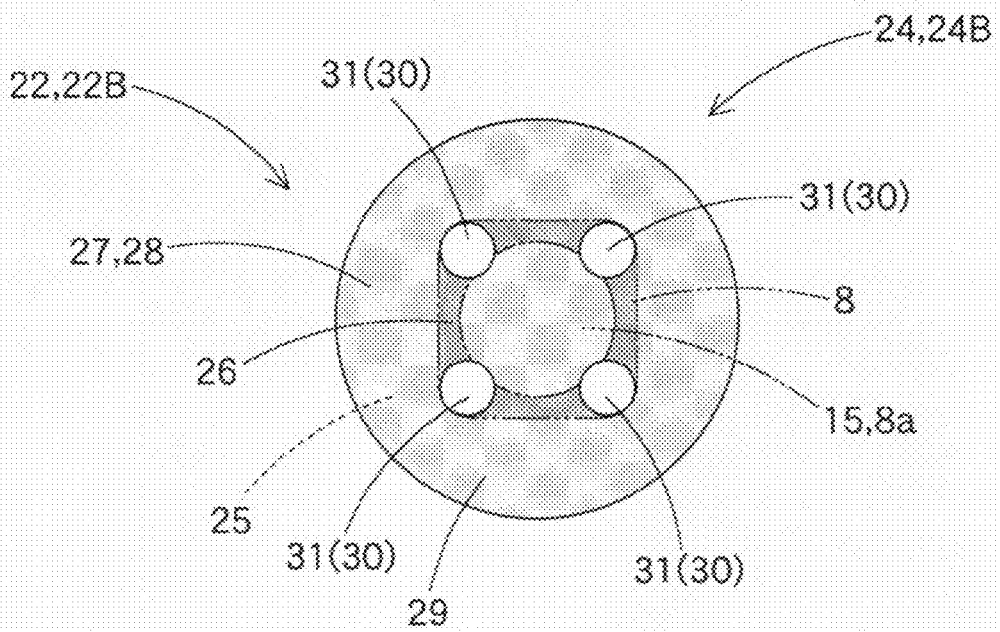
FIG. 5 is a plan view of one of reinforcing cloths of the airbag of FIG. 2.
Figure 6:
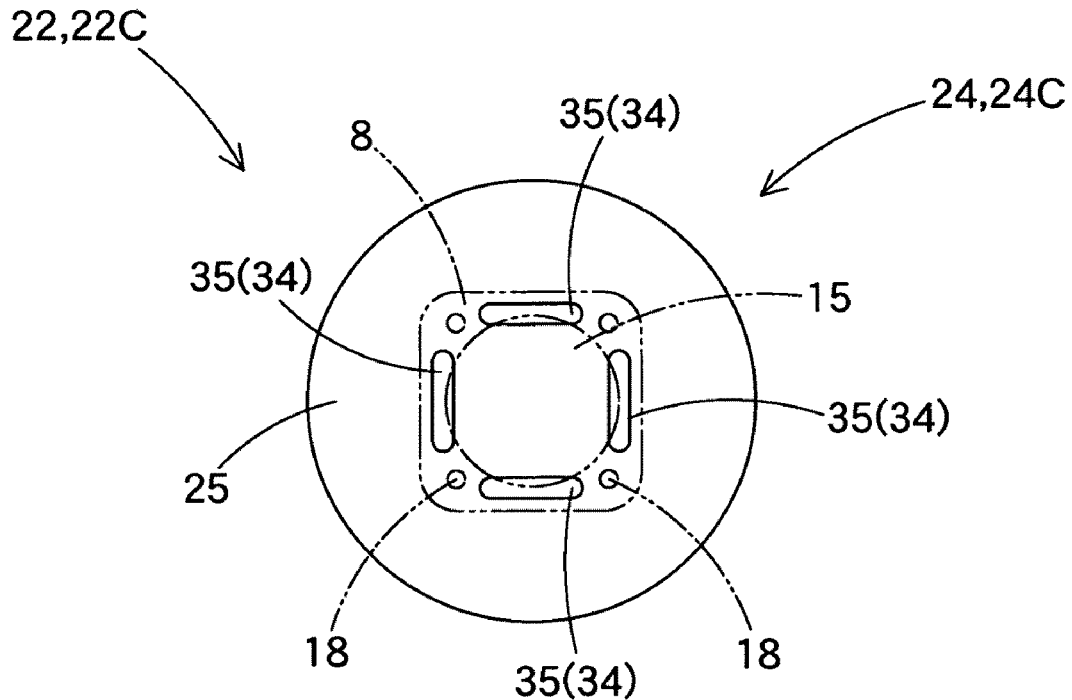
FIG. 6 is a plan view of another reinforcing cloth of the airbag of FIG. 2.
Figure 7:
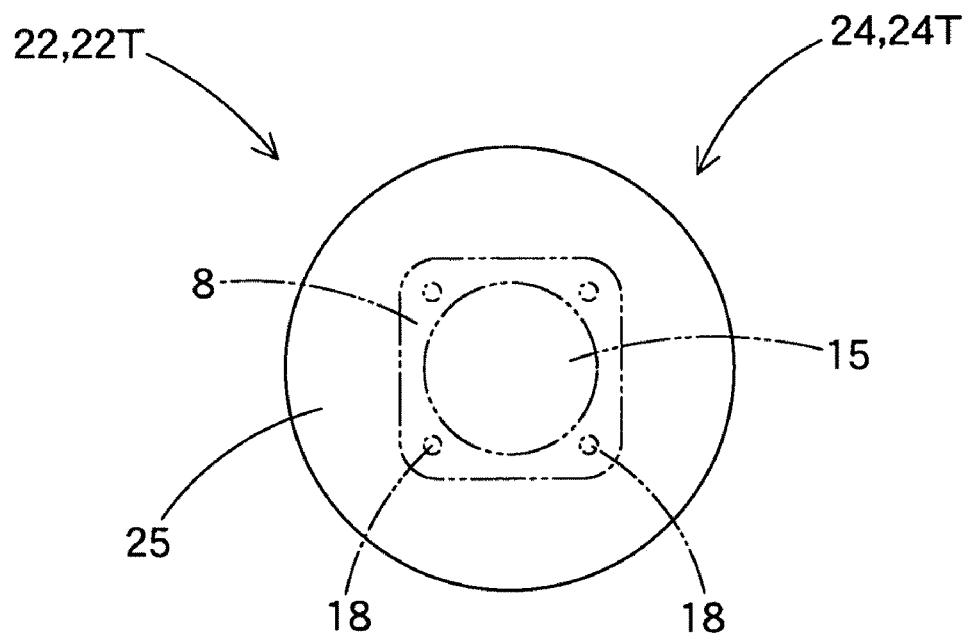
FIG. 7 is a plan view of yet another reinforcing cloth of the airbag of FIG. 2.

Out of the three sheets of reinforcing cloths 22, the lowermost cloth 22B, which immediately contacts the body cloth 21F or restraint panel 14 (FIG. 3), is provided on each location of the mounting holes 18 of the airbag 11 and their peripheries with a through hole 31 having a round shape when cut out from the material 23, as shown in FIG. 5. Moreover, as shown in FIGS. 3 and 6, the middle cloth 22C is provided in between the mounting holes 18 with through holes 35 having an oblong shape, in radial arrangement about the inlet port 15 of the airbag 11. In the illustrated embodiment, the through holes 35 are formed on the peripheral area of the inlet port 15 between the through holes 31 of the reinforcing cloth 22B.

FIG. 3 is an exploded perspective view of the finished airbag 11. The body cloth 21F and reinforcing cloths 22B, 22C and 22T are not yet provided with the inlet port 15 or mounting holes 18 when just cut out from the material 23.

Manufacturing of the airbag 11 is now described. Firstly, the body cloths 21F and 21R and the reinforcing cloths 22B, 22C and 22T preliminarily provided with the through holes 31 and 35 are cut out from the base cloth material 23. Subsequently, the body cloth 21F (i.e. base cloth 24A) and three sheets of reinforcing cloths 22B, 22C and 22T (or base cloths 24B, 24C and 24T) are adhered together. Specifically, referring to FIG. 9, the body cloth 21F (base cloth 24A) is laid on a support bed of a heat press machine with the adhesive layer 26 facing upward, and then the reinforcing cloth 22B (base cloth 24B) is placed over the body cloth 21F with its adhesive layer 26 facing upward. Subsequently the reinforcing cloth 22C (base cloth 24C) with the adhesive layer 26 facing downward is placed on the reinforcing cloth 22B and then the reinforcing cloth 22T (base cloth 24T) is placed over the reinforcing cloth 22C with its adhesive layer 26 facing downward. Depressing a heating plate of the heat press machine, locations of the through holes 31 and through holes 35 are heated under pressure. Then the adhesive layer 26 of the body cloth 21F (base cloth 24A) and that of the reinforcing cloth 22C (base cloth 24C) are bonded together at locations of the through holes 31 (namely at no-cloth areas 30 where there is no reinforcing cloth 22B), thus forming adhesion areas 32 whereas the adhesive layers 26 of the reinforcing cloths 22B and 22T (base cloths 24B and 24T) are bonded together at locations of the through holes 35 (namely at no-cloth areas 34 where there is no reinforcing cloth 22C), thus forming adhesion areas 36.

Thereafter, the inlet port 15 and mounting holes 18 are formed on the reinforced area RP (laminated area LP) by punching, and the mount-side panel 14 is completed as shown in FIGS. 8 and 9.

Thereafter the restraint panel 13 and mount-side panel 14 are overlaid one above the other so that respective outer sides contact each other, and joined together by outer peripheral edges 13a and 14a. The airbag 11 is completed when reversed inside out utilizing the inlet port 15. The outer peripheral edges 13a and 14a may be joined together by sewing, adhesion using the adhesive layers, or by combination of sewing and adhesion.

Figure 4:
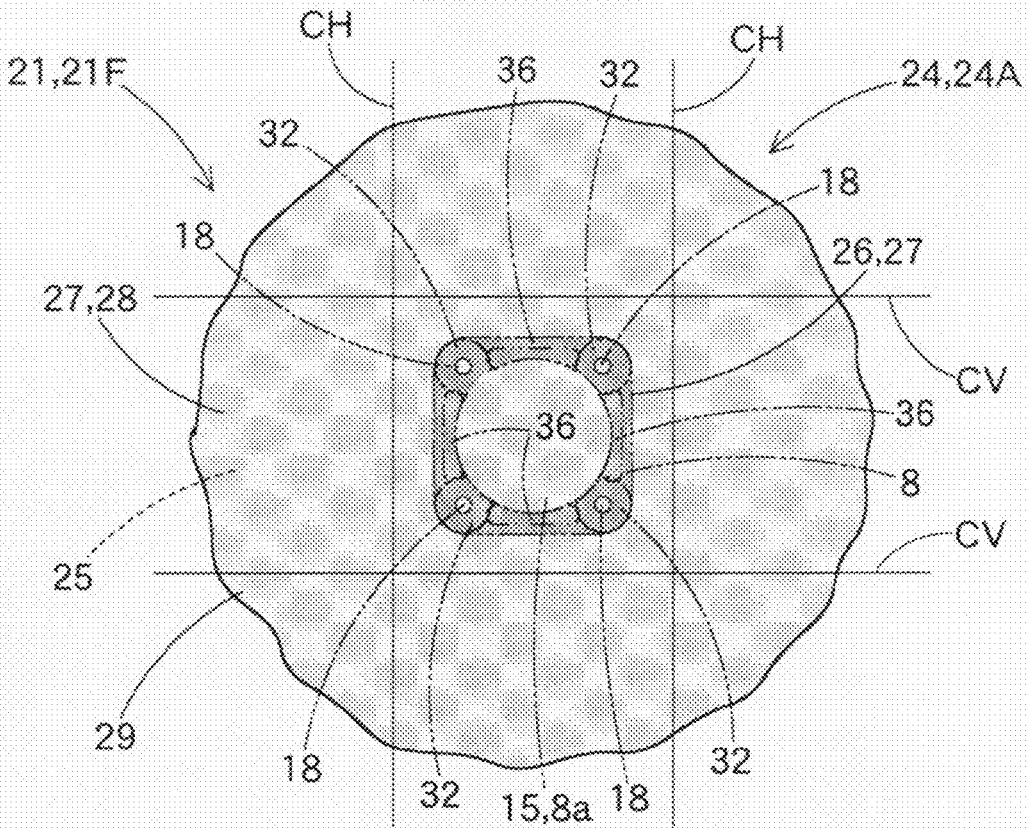
FIG. 4 is a partial enlarged plan view of a body cloth of the airbag of FIG. 2.
Figure 11A:
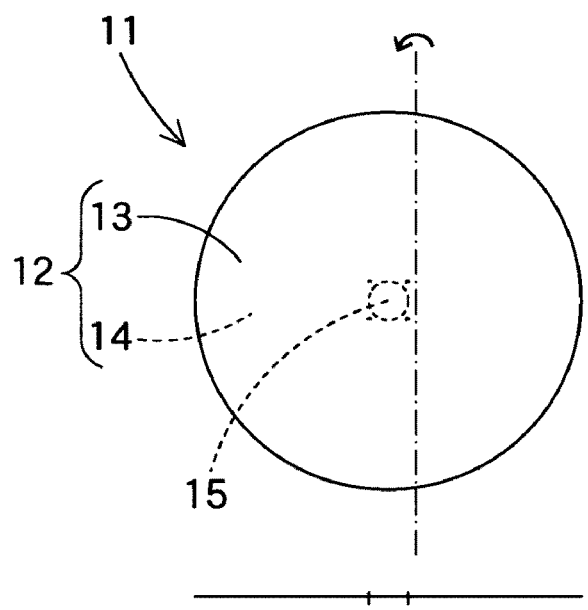
FIGS. 11A, 11B, 11C and 11D illustrate the folding process of the airbag of FIG. 2.
Figure 11C:
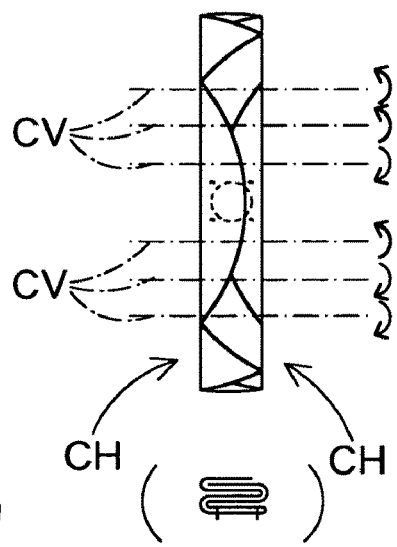
Figure 11B:
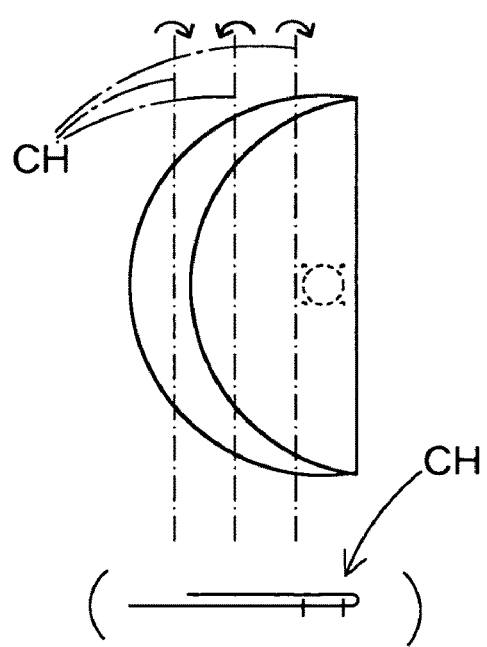
Figure 11D:
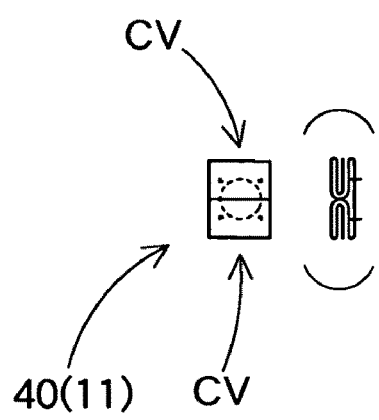

Assembling of the airbag apparatus M utilizing the airbag 11 is now described. Firstly, the retainer 8 is set inside the airbag 11 from the inlet port 15 so that the bolts 8b project from the mounting holes 18. The airbag 11 is folded up in that state. Specifically, from the flattened state shown in FIG. 11A, the airbag 11 is reduced in size in a left and right direction between outer edges on a diameter direction about the inlet port 15 as shown in FIGS. 11B and 11C, and then reduced in size in an anteroposterior direction between outer edges on a diameter direction about the inlet port 15 as shown in FIGS. 11C and 11D, thus forming a generally rectangular parallelepiped (generally cubic) folded-up body 40. The folded-up body 40 is wrapped up by a wrapping member for keeping the folded-up configuration. Creases CH (FIG. 11B) for reducing the dimension in a left and right direction and creases CV (FIGS. 11C, 11D) for reducing the dimension in an anteroposterior direction are so formed as to avoid the adhesion areas 32 and 36 in the peripheral area 16 of the inlet port 15 as shown in FIG. 4.

Then the airbag 11 or folded-up body 40 is placed on the bottom wall 4a of the case 4 equipped with the base plate 5 so that the bolts 8b of the retainer 8 project from the through holes 4c, and the body 7a of the inflator 7 is set in the airbag 11 via the insert hole 4b of the bottom wall 4a of the case 4 so the bolts 8b are inserted through the mounting holes 7d of the flange 7c. Then if the bolts 8b are fastened with the nuts 9, the airbag 11 and inflator 7 are secured to the bottom wall 4a of the case 4. Furthermore, by mounting the airbag cover 6 on the case 4, the airbag apparatus M is completed.

The airbag apparatus M thus assembled is mounted on the steering wheel body 1, which has been preliminarily mounted on the vehicle, by securing a predetermined region of the base plate 5 to the steering wheel body 1, and thus finishing the steering wheel W (FIG. 1).

When the airbag apparatus M is activated, inflation gas is discharged from the discharge ports 7b of the inflator body 7a, such that the airbag 11 inflates and opens the door 6a of the airbag cover 6 and projects from the boss area B of the steering wheel W.

The airbag 11 of the first embodiment, as shown in FIG. 9, includes at the no-cloth areas 30 and 34 the adhesion area 32 of the base cloths 24A and 24C and the adhesion area 36 of the base cloths 24B and 24T that help keep all the base cloths 24A, 24B, 24C and 24T bonded together without slippage from one another in a direction LH orthogonal to the layering direction LD in the area of the reinforced area RP or laminated area LP.

Specifically, the adhesion areas 32 where the base cloth 24C (reinforcing cloth 22C) is directly bonded to the base cloth 24A prevent the base cloth 24C from slipping from the base cloth 24A in the direction LH orthogonal to the layering direction LD (FIG. 9). The base cloths 24B and 24T (reinforcing cloths 22B and 22T) are bonded together at the adhesion areas 36. The adhesion areas 32 limit the positions of peripheries of the through holes 31 and prevent the base cloth 24B from slipping from the base cloth 24A in the direction LH orthogonal to the layering direction LD. The adhesion areas 36 are limited in position by peripheries of the through holes 35 formed on the base cloth 24C such that the base cloths 24B and 24T are prevented from slipping from the base cloth 24C in the direction LH orthogonal to the layering direction LD. Since this base cloth 24C is directly bonded to the base cloth 24A, the base cloths 24B and 24T come to be prevented from slipping from the base cloth 24A in the direction LH orthogonal to the layering direction LD indirectly through the base cloth 24C.

That is, all the reinforcing cloths 22B, 22C and 22T (base cloths 24B, 24C and 24T) are bonded to the body cloth 21F without slippage in the direction LH orthogonal to the layering direction LD and bonded in close contact with one another. This configuration makes it easy to insert the bolts 8b of the retainer 8 into the mounting holes 18 at the assembling of the airbag apparatus M, thus improving handleability of the airbag 11.

Since the body cloth 21F and all the reinforcing cloths 22B, 22C and 22T are bonded together without slippage, in other words all the reinforcing cloths 22B, 22C and 22T are directly or indirectly bonded to the body cloth 21F, even in the event that a tension force acts on the body cloth 21F at inflation of the airbag 11, the tension force will be distributed among the reinforcing cloths 22B, 22C and 22T, and thus enhancing the tensile strength of the body cloth 21F.

At the bonding work during manufacturing the airbag 11, although the base cloths 24A, 24B, 24C and 24T have adhesive layers 26 only on one surface, all the base cloths 24A, 24B, 24C and 24T are directly or indirectly bonded together without sewing or the like if heated under pressure with the adhesive layers 26 of the base cloths 24A and 24C applied face to face at the no-cloth areas 30 and with the adhesive layers 26 of the base cloths 24B and 24T applied face to face at the no-cloth areas 34.

The inlet port 15 and mounting holes 18 formed on the reinforced area RP (laminated area LP) are formed by laser cutting or the like after bonding all the base cloths 24A, 24B, 24C and 24T at the adhesion areas 32 and 36. Since the base cloths 24A, 24B, 24C and 24T are bonded together without slippage, the inlet port 15 and mounting holes 18 are formed smoothly at the desired positions.

Therefore, although including the reinforced area RP that has a laminated structure of four sheets of the base cloths 24A, 24B, 24C and 24T, the airbag 11 of the first embodiment is readily manufactured and secures a good handleability.

In the first embodiment, referring to FIGS. 8 and 9, an additional adhesion area 38 may be formed by bonding together the adhesive layers 26 of the adjoining base cloths 22B and 22C (base cloths 24B and 24C) in a periphery of the through hole 35 by using such a heating plate of heat press that has an identical contour to the retainer 8, for example. With this configuration, the base cloth 24C is directly bonded to the base cloth 24A at the adhesion area 32, the base cloth 24B is directly bonded to the base cloth 24C at the adhesion area 38, and the base cloth 24T is directly bonded to the base cloth 24B at the adhesion area 36. That is, in such an airbag 110 as has the additional adhesion area 38, (FIGS. 8 and 9), the adhesion areas 32, 36 and 38 bond the base cloths 24B, 24C and 24T to the base cloth 24A directly or indirectly.

In the airbag 11 of the first embodiment, the reinforcing cloth 22C, namely a first reinforcing cloth 221, is directly bonded to the body cloth 21F by the adhesion areas 22, which also act as annular adhesion areas 39 that are formed in entire circumferences 19 of the mounting holes 18 and immediately around the mounting holes 18. That is, the first reinforcing cloth 221 is bonded to the body cloth 21F in such a manner as to double the base cloths in the circumferences 19 of the mounting holes 18 for reinforcement. This configuration enhances tensile strength of the circumferences 19 of the mounting holes 18 including the annular adhesion areas 39 and causes no raveling or tear in the circumferences 19 even in the event that a tension force acts on those areas in accordance with airbag inflation, thus allowing a smooth inflation of the airbag 11.

Figure 18:
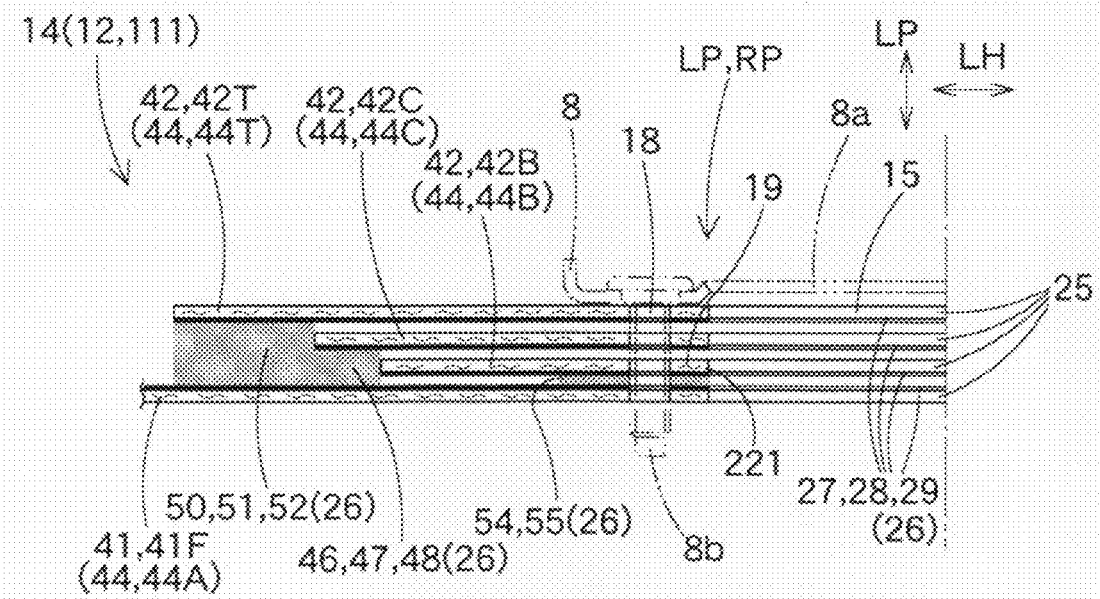
FIG. 18 is a vertical section taken along line XVIII-XVIII of FIG. 17.

When forming such annular adhesion areas 39 as described above, the body cloth 21F and the first reinforcing cloths 221 may be so adjacent that whole opposing planes of the cloths 21F and 221 contact each other like later-descirbed annular adhesion areas 55 illustrated in FIG. 18. Alternatively, at least one other sheet out of the remaining reinforcing cloths 22, namely a second reinforcing cloth 222, like the reinforcing cloth 22B of the first embodiment, may be located between the base cloths to be bonded together, i.e. the body cloth 21F and the first reinforcing cloths 221. The latter case will be arranged by providing the through holes 31 acting as the no-cloth areas 30 on the second reinforcing cloth 222 in such a manner as to enlarge the circumferences 19 of the mounting holes 18 so the body cloth 21F and first reinforcing cloth 221 are directly bonded together at the through holes 31 to form the annular adhesion areas 39.

In the first embodiment, the adhesive 27 is made from polyamide elastomer and the fabric 25 for forming the base cloths 24 is made of polyamide fiber. This makes the airbag 11 recyclable as polyamide material although the base cloths 24 have coating layers of the adhesive 27.

Figure 10:
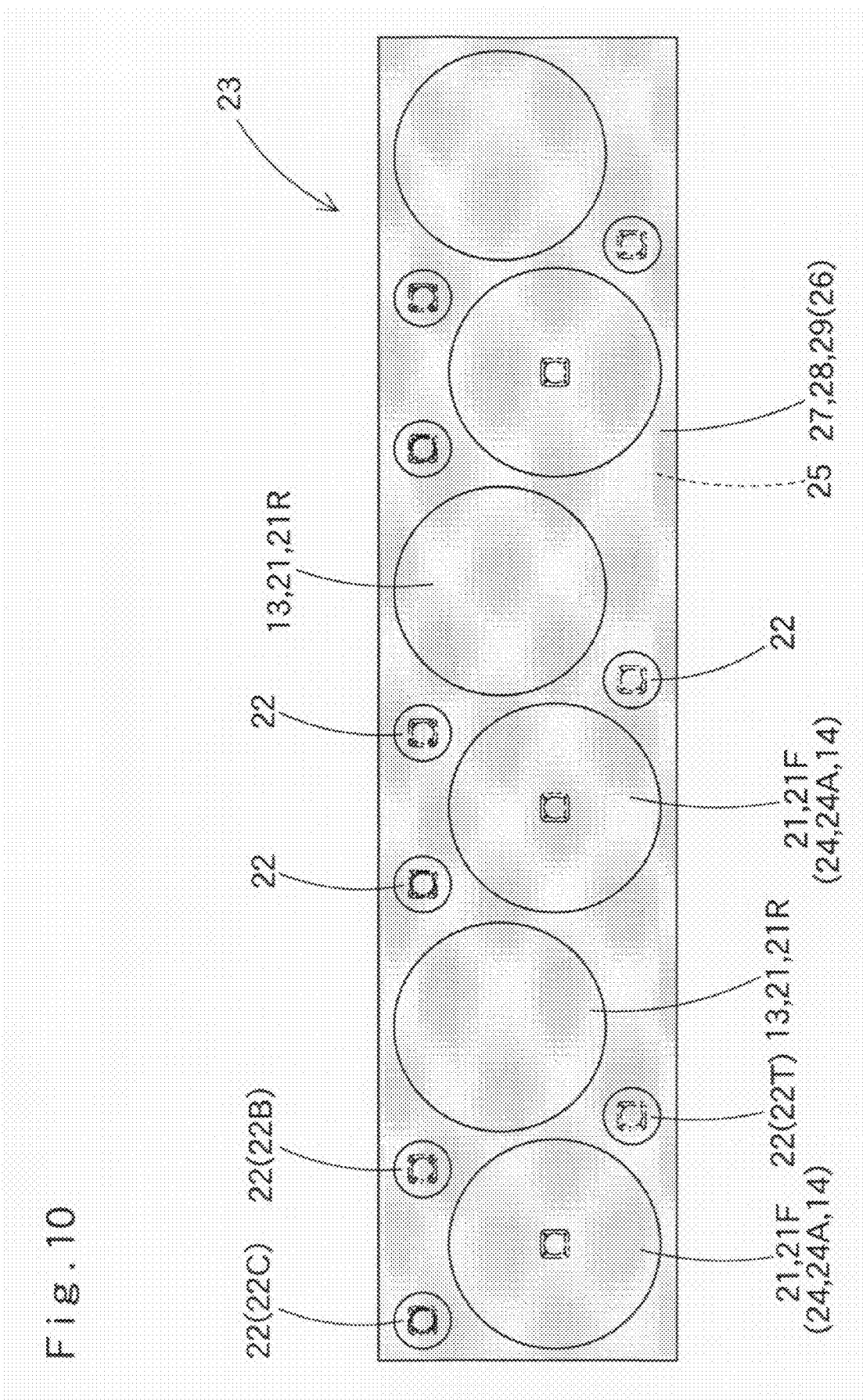
FIG. 10 is a plan view of a base cloth material used in the first embodiment.

Moreover, in the first embodiment, the airbag 11 is made of the base cloths 24 that are coated by the same material as the adhesive 27 as a coating agent 28 for reducing gas-permeability. That is, the airbag 11 has an improved air-tightness while retaining recyclability. With this configuration, the base cloths 24 may be manufactured by firstly forming an elongative and continuous band-shaped base cloth material 23 coated by the coating agent 28 which is the same material as the adhesive 27, as illustrated in FIG. 10, by printing technique such as transfer roll, spray coating, brush coating or the like, and then cutting the base cloths 24, i.e. the body cloth 21 and reinforcing cloths 22 out of the material 23 in predetermined shapes. Since the base cloths 24 are preliminarily coated with the adhesive 27, a separate application of the adhesive 27 on the adhesion areas 32 and 36 can be omitted or simplified, and thus facilitating the manufacturing of the airbag 11.

If more quantity of the adhesive 27 is needed than that capable of securing gas unpermeability in order to enhance the adhesion between the adhesive layers 26, further adhesive 27 is applied on the adhesion areas 32 and 36. If the airbag is made of fabric having no coating, the adhesive 27 is applied on the locations of the adhesion areas of the fabric.

In the airbag 11 of the first embodiment, the laminated area LP includes the inlet port 15 for admitting inflation gas and the mounting holes 18 arranged radially about and in the periphery of the inlet port 15. Further, the laminated area LP is mounted on the bottom wall 4a of the case 4 with the retainer 8 that is annular in shape, includes the bolts 8b (or mounting means) to be inserted into the mounting holes 18 and holds down the periphery 16 of the inlet port 15 onto the bottom wall 4a of the case 4. The adhesion areas 32 and 36 of the base cloths 24 fall upon the area of the retainer 8 in a view projected along the layering direction LD of the laminated area LP, that is, upon the area directly held down by the retainer 8. With this configuration, when the retainer 8 holds down the stiff adhesion areas 32 and 36 onto the bottom wall 4a of the case 4, the adhesion areas 32 and 36 are coupled in a monolithic manner, thus enhancing the bond strength of the body cloth 21F and the reinforcing cloths 22B, 22C and 22T and further enhancing tensile strength that counteracts the tension force actable on the body cloth 21F.

In the first embodiment, moreover, the adhesion areas 32 and 36 of the base cloths 24 are so located as to avoid locations of the creases CH and CV used to fold up the airbag 11 as shown in FIG. 4. This configuration enables compact folding of the airbag 11 since the creases CV and CH are not formed on the bulky adhesion areas 32 and 36.

Although the fabric 25 of the first embodiment has been described as woven by nylon 66, other polyamide yarns, by way of example aliphatic polyamide such as nylon 6, nylon 46 and nylon 12 other than nylon 66; aromatic polyamide such as aramid, may be used for weaving the fabric 25. Out of these, nylon 66 is preferable from the viewpoint of heat-resistance and versatility. The reasons are as follows:

Nylon 66 has a higher melting point (265° C.) than other general-purpose nylon; nylon 6 (225° C.), nylon 11 (187° C.) and nylon 12 (176° C.). Having an even higher melting point (290° C.), nylon 46 is peculiar and expensive. Although aromatic polyamide has high mechanical strength, it is inferior in abrasion resistance.

The polyamide yarn used to weave the fabric 25 is normally multiple wound yarn of 200 to 700 dtex though depending on types of polyamide. For example, nylon 66 multiple wound yarn consisting of 72 filaments, the fineness being 470 dtex is used. The type of weave of the fabric may be twill weave or satin weave other than plain weave.

The cover factor (K) of the fabric 25, which is obtained by the following formula, is desirably 1200 to 2400.

$$K = NW \times DW^{0.5} + NF \times DF^{0.5}$$

where NW is the warp density (yarns/inch), DW is the warp fineness (denier), NF is the weft density (yarns/inch) and DF is the weft fineness (denier).

The low or high cover factor (K) relative to the above-mentioned value means that warp and weft densities and/or warp and weft finenesses are relatively low or high.

If the yarn density and/or fineness are/is low, it would be hard for the fabric 25 to obtain desired mechanical strength. If the yarn density is low, slippage is likely to occur and collapse the texture.

If the yarn density and/or fineness are/is high, the rigidity of the fabric 25 would hardly settle within a desired value. Furthermore, if the yarn density is high, the fabric 25 would become so thick, which may adversely affect the foldability and storability of the airbag 11.

The adhesive layer 26 formed on one surface of the fabric 25 is made of polyamide elastomer concurrently acts as the coating layer 29 that reduces the gas permeability and is recyclable together with the fabric 25. In this specific embodiment, the coating layer 29 is formed as thin as possible from the viewpoint of flexibility, and has a macrostructure where the polyamide elastomer infiltrates into gap openings of the texture of the surface of the fabric 25. The polyamide elastomer used to form the coating layer 29 desirably has following characteristics:

(1) Melting point: 135 to 200° C. Preferably 145 to 185° C., and further preferably 155 to 180° C.

The difference between the melting point of the polyamide yarn of the fabric 25 and that of polyamide elastomer of the coating layer 29 should be 120° C. and below, preferably 90° C. and below, and further preferably 80° C. and below.

If the melting point is higher than the above range, the degree of crystallinity increases relative thereto, thus increasing the rigidity, i.e. reducing the flexibility, of the base cloths 24. This will make it difficult to fold up the airbag, and the desired unfurling performance will be hard to secure at airbag deployment. That is, the too high melting point is likely to impair smooth unfurling of the airbag 11 when fed with inflation gas. Conversely, the melting point lower than the above range will make it difficult to secure the desired air tightness (air unpermeability) at airbag deployment, and further increases the difference of the melting points between the polyamide yarn of the fabric 25 and the polyamide elastomer of the coating layer 29, which will make the base cloths 24 unsuitable as recyclable material.

(2) Tensile elongation at rupture (ASTM D638): 200% and above. The tensile elongation at rupture lower than this range will impair the flexibility of the base cloths 24 and may cause cracks in the elastomer coating film by the stress at airbag deployment, which will deteriorate the air tightness.

(3) Flexural modulus (ASTM D790): 200 MPa and below. The flexural modulus higher than this range will impair the flexibility of the base cloths 24. Although the flexural modulus is desirably low, the lower limit thereof is normally 50 MPa.

(4) Water absorption, Equilibrium (ASTM D570; 20° C.×65% R): 3% and below, and preferably 2% and below. The water absorption higher than this range may allow the coating film to absorb moisture, which may cause peel-off of the coating film.

It is confirmed that the water absorption is advantageous in coating adhesion when it is equal to the water absorption, equilibrium (3.3 to 4.5%) of nylon 66 fiber of the polyamide yarn of the base cloths 24 or slightly lower than that.

(5) Contains no environmental load substances such as residual formalin. It is desired that the polyamide elastomer for the coating layer 29 does not contain environmental load substances from the viewpoint of recycling.

The type of polyamide elastomer is not limited as long as it satisfies the above characteristics (1) and desirably (2) to (5), and can be selected from the types specified below. Among them, block copolymer type polyamide elastomer is preferable since it provides desired melting point (heat resistance) and flexibility (tensile elongation at rupture and flexural modulus).

(1) Block copolymer type: PEBA (polyether block polyamide) having polyamide (PA) blocks as hard segments and polyether (PE) blocks as soft segments, which is represented by the following structural formula, can be preferably used.

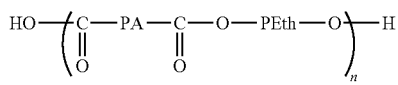

By way of example, polytetramethylene ether glycol, polypropylene glycol or the like can be used as the polyether. The soft segment may alternatively be formed of polyester block such as aliphatic polyester diol.

(2) Crystalline-reduced type: This is the type with reduced crystallinity obtained by subjecting chains of nylon molecules to graft polymerization with a functional group (for example, an alkoxyalkyl group) and separating distances between the molecules to reduce the intermolecular attractive force.

(3) Polymer alloy type: The polymer alloy type has a sea-island structure where rubber fine particles such as EPDM are dispersed in PA resin.

(4) Plasticizer type: The plasticizer type is a softened PA obtained by adding plasticizer. By way of example, butylbenzenesulfonamide, N-alkyltoluenesulfonamide, hexylene glycol and p-oxybenzoic acid ester-2 can be used as the plasticizer.

The polyamide (PA) elastomer described above is applied to the fabric 25 in the form of dispersion liquid (emulsion) or solution.

The particle diameter of the PA elastomer dispersed in the emulsion ranges normally 0.05 to 5 µm, preferably 0.2 to 5 µm, and more preferably 0.2 to 1 µm.

The mode of emulsion includes the following methods by way of example:

(1) Solvent substitution method: Dissolve a polymer in a solvent and then add an emulsifier and water thereto to carry out phase reversal (the solvent is collected).

(2) Pressure method: Agitate a polymer, an emulsifier and water in a vessel under high temperature and high pressure for emulsification.

(3) Machine emulsification method: Carry out emulsification by a mechanical shear force using a biaxial extruder.

When used in the form of solution, cyclohexanone, cresol or the like are used as solvent.

The method of applying the emulsion or solution of the polyamide can be arbitrarily selected from printing (such as transfer printing), dipping, knife coating (die coating), comma coating and reverse coating. In view of securing flexibility of the base cloths 24, what is preferable among these is the method that can easily form a thin coating film of elastomer on one surface of the fabric 25 by having the multiple would yarn impregnated with the PA by surface and making the PA infiltrate into recesses of the gaps of the texture on one surface of the fabric 25.

The coating amount (based on dry weight) can be selected arbitrarily from the range of 10 to 100 $gm^{-2}$, preferably 10 to 25 $gm^{-2}$, and more preferably 10 to 20 $gm^{-2}$, considering the balance of the air permeability, flexibility (foldability) and adhesiveness required for the airbag.

After applying the polyamide elastomer, the fabric 25 is usually subjected to heat treatment in order to bond (fusion bond) the PA coating film to the fabric 25. At this time, the fabric 25 is desirably in such conditions that the PA coating film is in the state of surface impregnation relative to the multiple wound yarn and has not passed constricted parts (bottlenecks: minimum clearance part) of gap openings of the textures that run through to the other surface. Thus the base cloths 24 maintain or secure flexibility. If the multiple wound yarn is impregnated further with the PA up to the interior thereof and/or if the PA has passed through the constricted parts of the gap openings of the texture to form a coating film on the back surface as well, the fabric 25 or base cloths 24 will acquire rigidity, and thereby impairing the flexibility.

The heat treatment is carried out at a temperature that is higher than the melting point of the polyamide forming the coating film by 5 to 30° C. (desirably 10 to 20° C.) and is lower than that of the polyamide forming the fabric 25 by 30°

C. and above (desirably 50° C. and above) and for 0.5 to 10 minutes (desirably 0.5 to 5 minutes). If the difference between the treatment temperature and the melting point of the PA elastomer is small, fusion bonding will be difficult and the adhesiveness will not be sufficient. On the contrary, if the difference between the treatment temperature and the melting point of the PA elastomer is too large, the fusing fluidity of the PA elastomer will be increased, which allows the PA elastomer to infiltrate into the gap openings of the texture of the fabric 25 thoroughly. This will promote the heat deterioration of the base cloths 24 as well as impair the flexibility of the base cloths 24. That is, if the treatment temperature is set way higher than the melting point of the PA elastomer, the temperature will hardly be 30° C. and above (preferably 50° C. and above) lower than the melting point of the polyamide forming the fabric 25.

The base cloths 24 manufactured as described above has an air permeability (measured by a high pressure airflow-measuring device 20 KPa) of 1.5 $Lcm^{-2}min^{-1}$ and below, desirably 0.5 $Lcm^{-2}min^{-1}$ and below, further desirably 0.2 $Lcm^{-2}min^{-1}$ and below, and a Frazier air permeability (JIS L 1096-A method) of 0.01 $mLcm^{-2}s^{-1}$ and below, desirably 0.003 $mLcm^{-2}s^{-1}$.

The PA elastomer used in the first embodiment is PEBA commercially available and having the following characteristics:

(1) Melting point (ASTM D3418): 160° C.
(2) Tensile elongation at rupture (ASTM D638): 450%
(3) Flexural modulus (ASTM D790 (ISO 178)): 84 MPa
(4) Water absorption, Equilibrium (ASTM D570; 20° C.×65% R): 1.2%

The adhesive force between the adhesive layers 26 of the base cloths 24 is desirably 200 to 600N, more desirably 200 to 300N when measured by Tensile shear adhesion test according to JIS K 6850. If the adhesive force is too low, the tensile strength of the reinforced area RP will not be sufficient, whereas too high adhesive force will increase the coating amount and weight of the adhesive 27, which is not preferable. In the event that the coating amount of the coating layer 29 is not enough to secure the desired adhesive force, the adhesive 27 should be additionally applied to areas to be bonded.

In the first embodiment, the no-cloth areas 30 and 34 are comprised of the through holes (can also be referred to as inner spaces) 31 and 35 formed on the base cloths 24B and 24C. Alternatively, the airbag may be configured as an airbag 111 of the second embodiment shown in FIGS. 12 to 18, in which no-cloth areas 46 and 50 are comprised of outer spaces 47 and 51 formed on base cloths 44B and 44C.

Figure 12:
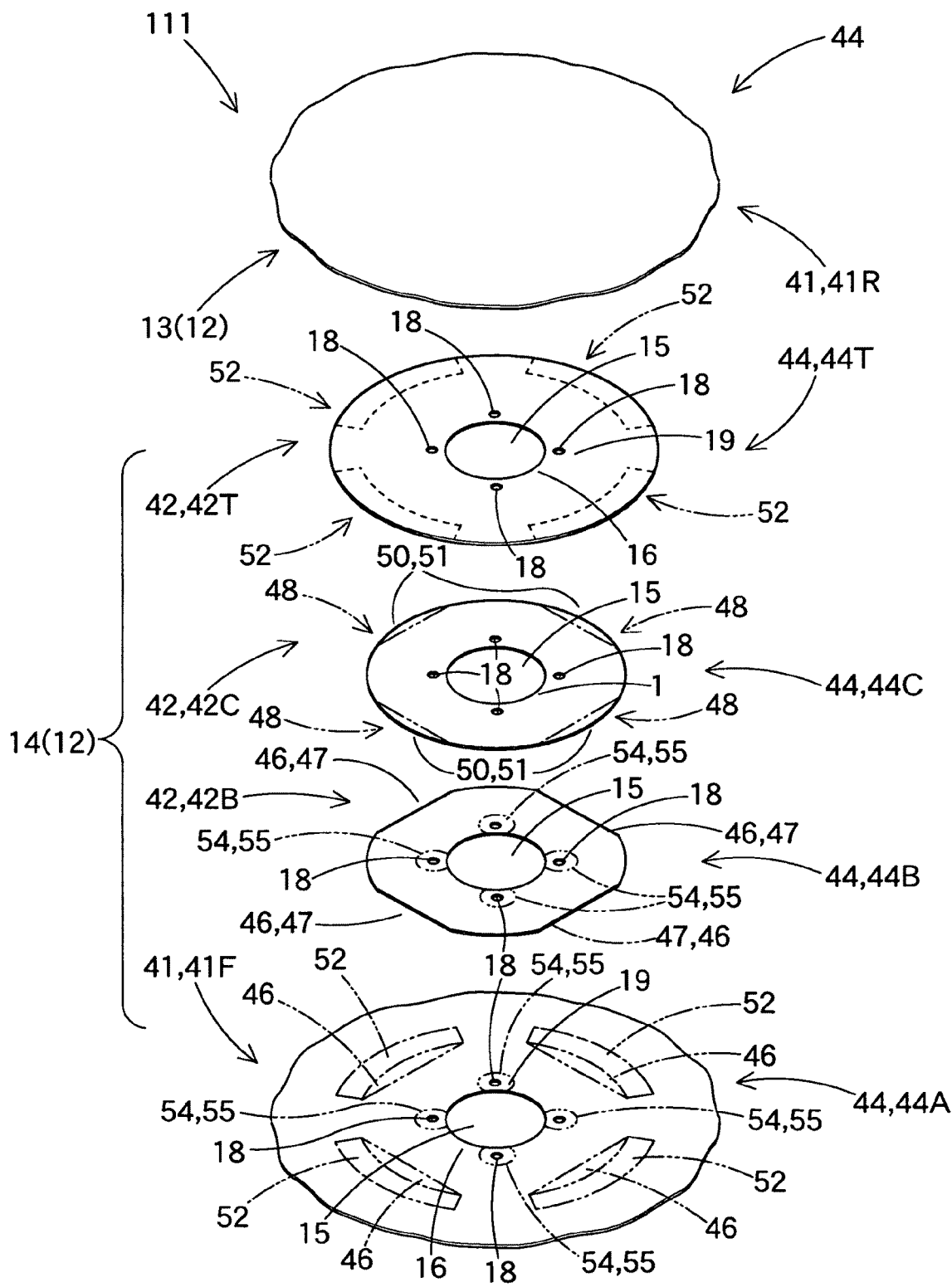
FIG. 12 is a partial enlarged exploded perspective view of components of an airbag according to the second embodiment of the invention.
Figure 14:
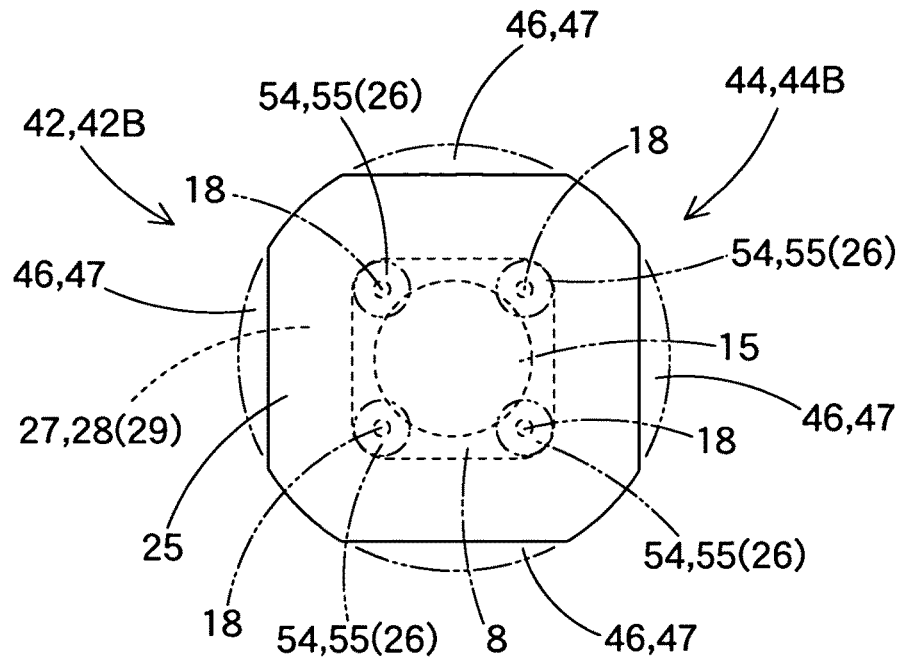
FIG. 14 is a plan view of one of reinforcing cloths of the airbag of the second embodiment.
Figure 15:
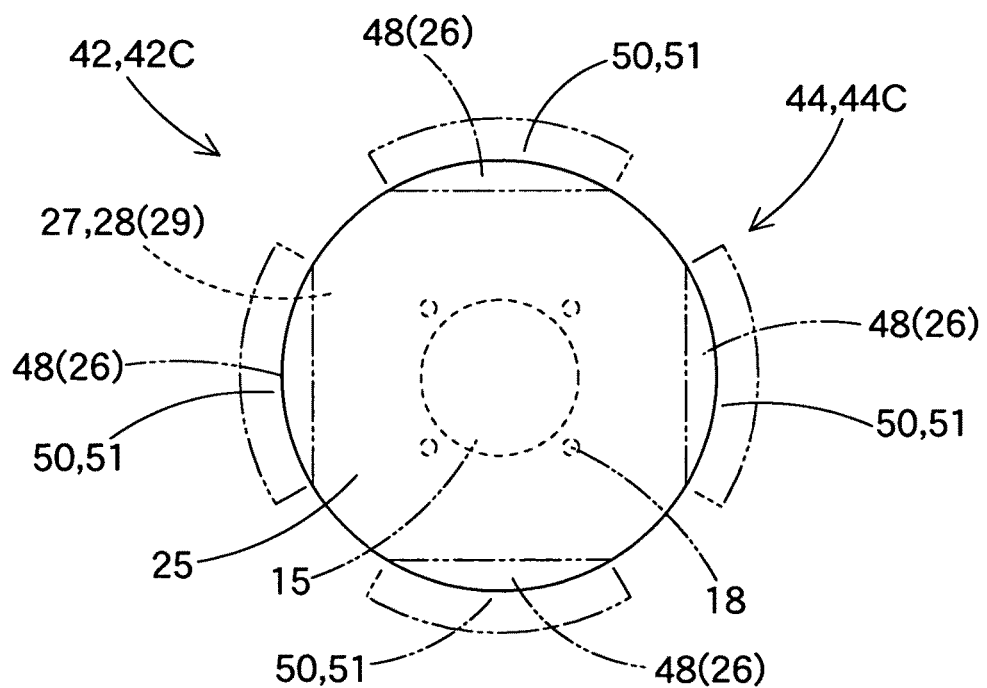
FIG. 15 is a plan view of another reinforcing cloth of the airbag of the second embodiment.
Figure 16:
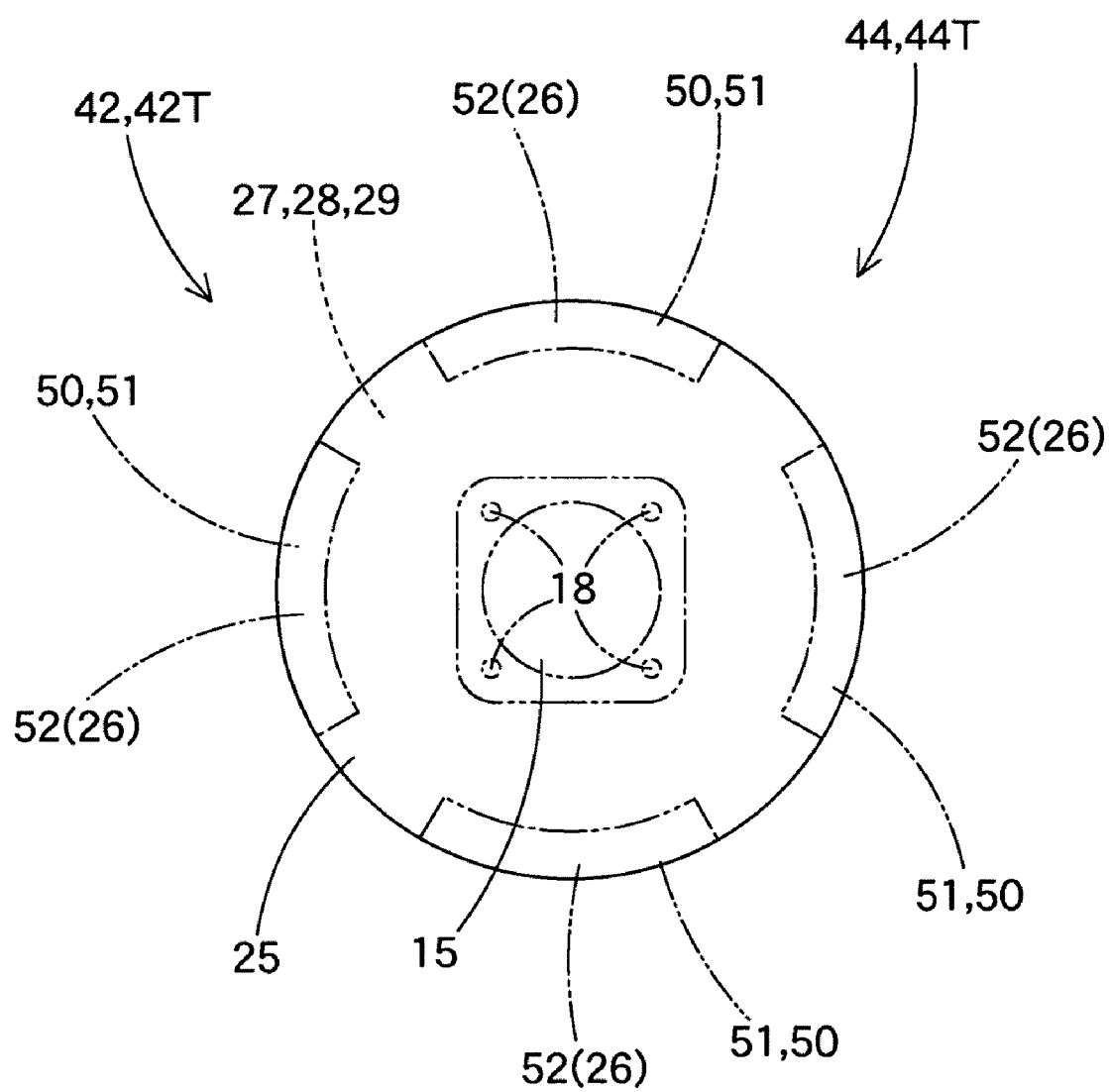
FIG. 16 is a plan view of yet another reinforcing cloth of the airbag of the second embodiment.

The airbag 111 is used for an airbag apparatus M for a driver's seat as well as in the first embodiment. The airbag 111 includes a pair of body cloths 41 (41F and 41R) that act as a restraint panel 13 and a mount-side panel 14 and three sheets of reinforcing cloths 42 (42B, 42C and 42T) that are generally round in shape and smaller in area than the mount-side panel 14 or body cloth 41F to which the reinforcing cloths 42 are connected. The body cloths 41 and reinforcing cloths 42, i.e. base cloths 44 are manufactured in the same way as the base cloths 24 of the first embodiment, i.e. by coating a same fabric 25 as in the first embodiment by a same adhesive 27 as in the first embodiment. The differences from the first embodiment are as follows: Firstly, the reinforcing cloth 42T (or base cloth 44T) which is located uppermost and away from the body cloth 41F has a round (discoid) shape that has a larger outer diameter than the reinforcing cloth 22T (or base cloth 24T) of the first embodiment by areas of later-described outer spaces 51 (adhesion areas 52) as shown in FIGS. 12 and 16. The reinforcing cloth 24B (base cloth 44B) contacting the body cloth 41F has a generally square plate shape wherein outer peripheral edges in between the mounting holes 18 are straight as shown in FIGS. 12 and 14. Further, adhesion areas 48, 52 and 54 of the base cloths 44 slightly differ from the first embodiment in contour and location. The reinforcing cloth 42C located between the reinforcing cloths 42T and 42B has a round shape that has a similar outer diameter to the reinforcing cloth 22T of the first embodiment as shown in FIGS. 12 and 15. The laminated area LP or reinforced area RP where the reinforcing cloths 42 overlap one above another includes therein an inlet port 15 and four mounting holes 18 formed in the periphery 16 of the inlet port 15.

Figure 13:
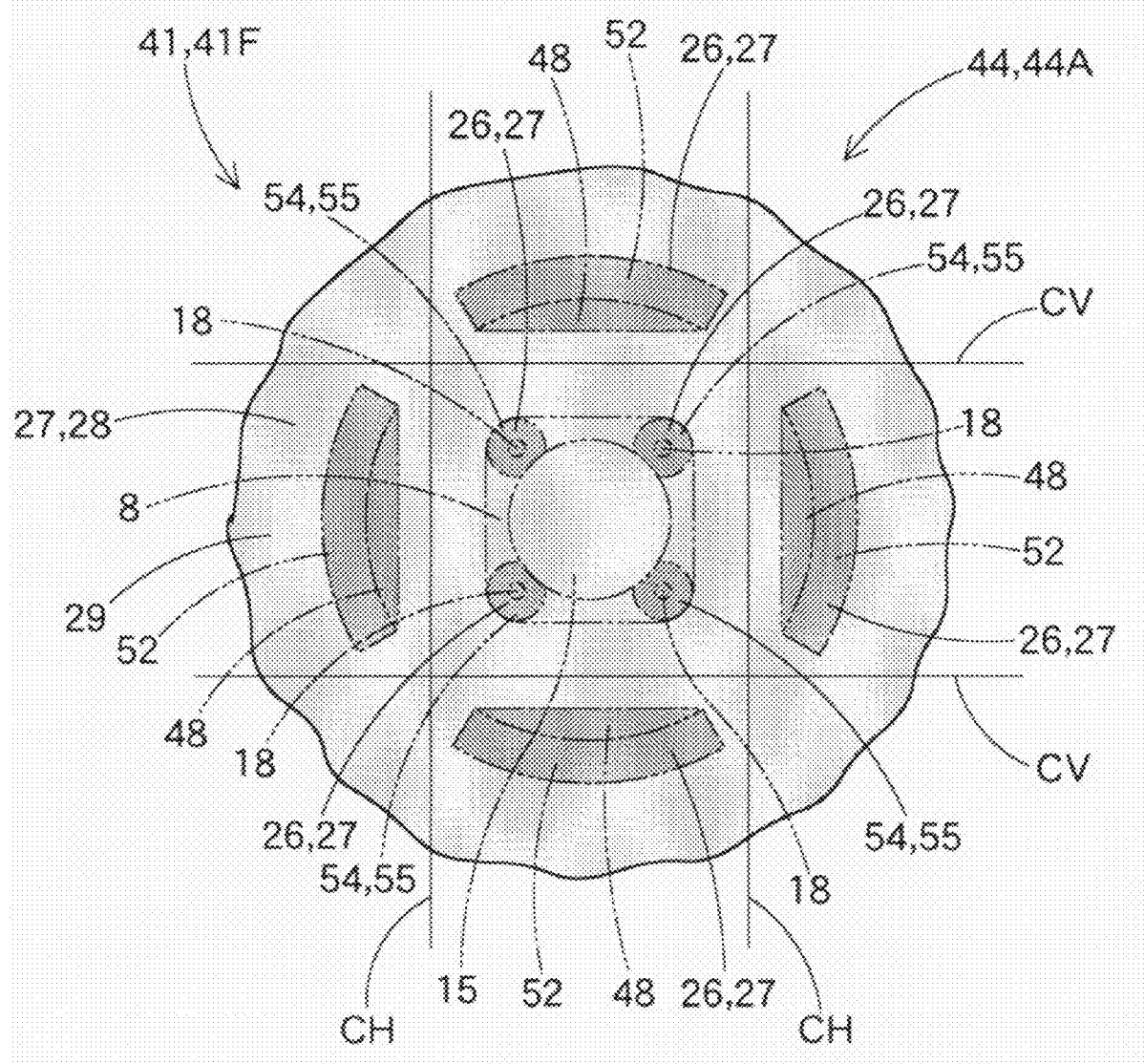
FIG. 13 is a partial enlarged plan view of a body cloth of the airbag of the second embodiment.

Referring to FIGS. 12 and 13, the adhesion areas 48 are areas where the body cloth 41F and reinforcing cloth 22C are bonded together utilizing outer spaces or no-cloth areas 46 of therein forcing cloth 22B. Specifically, the adhesion areas 48 are located on crescent-shaped areas that are on outside of and proximate respective sides of generally square-shaped reinforcing cloth 22B. The adhesion areas 52 are areas where the body cloth 41F and reinforcing cloth 22T are bonded together utilizing outer spaces or no-cloth areas 50 of the reinforcing cloth 22C. Specifically, the adhesion areas 52 are located on sectorial areas that are outside of and proximate the adhesion areas 48. The adhesion areas 54 are areas where the body cloth 41F and reinforcing cloth 22B are bonded together and located on annular areas (annular adhesion areas 55) around and adjacent the mounting holes 18.

Manufacturing of the airbag 111 of the second embodiment is started by cutting the body cloths 41F, 41R and reinforcing cloths 42B, 42C and 42T out of an unillustrated base cloth material 23. As shown in FIGS. 13 to 16, the body cloth 41F or reinforcing cloths 42B, 42C and 42T are not yet provided with the inlet port 15 or mounting holes 18 at this point. FIG. 12 is an exploded perspective view of the finished airbag 111.

Figure 17:
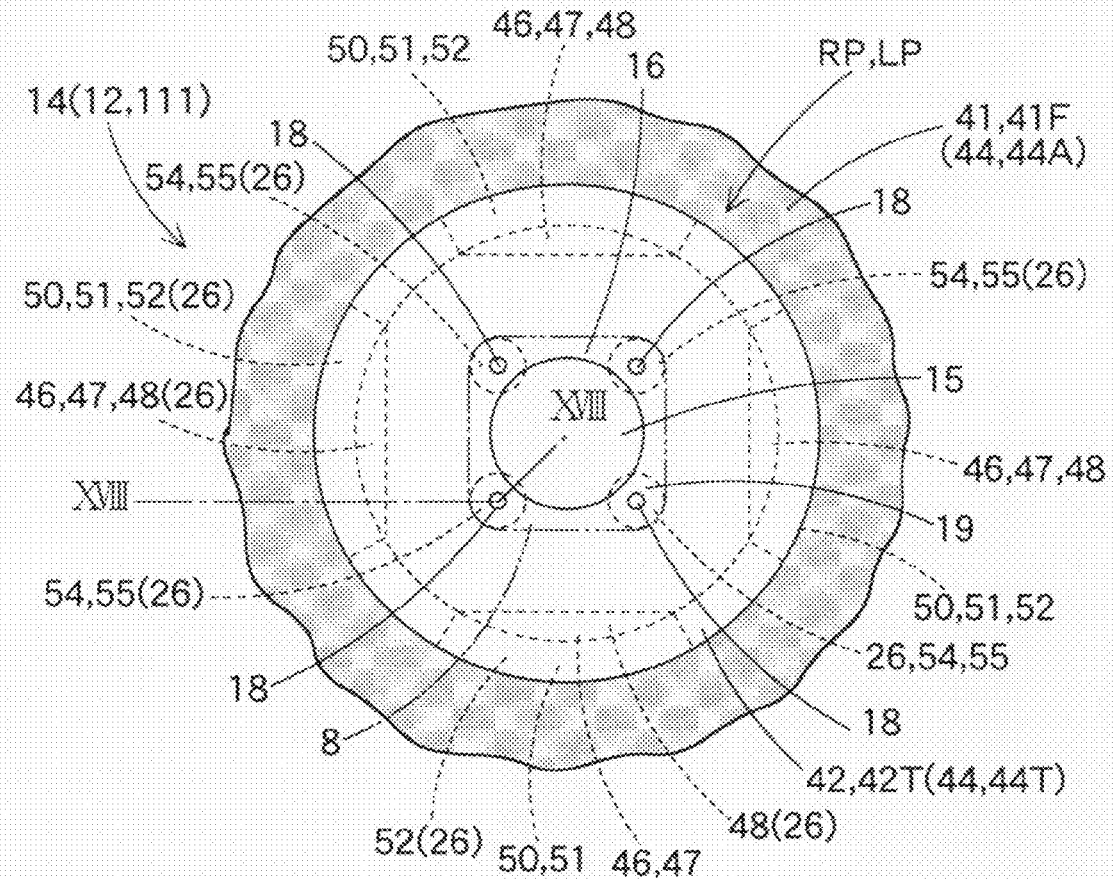
FIG. 17 is a partial enlarged plan view of a vicinity of an inlet port of the airbag of the second embodiment.

Subsequently, the body cloth 41F (i.e. base cloth 44A) and three sheets of reinforcing cloths 42B, 42C and 42T (or base cloths 44B, 44C and 44T) are adhered together at the adhesion areas 48, 52 and 54. Specifically, the body cloth 41F (base cloth 44A) is laid on a support bed of a heat press machine with the adhesive layer 26 facing upward, and then the reinforcing cloth 42B (base cloth 44B) is placed over the body cloth 41F with the adhesive layer 26 facing downward. Subsequently, the reinforcing cloth 42C (base cloth 44C) with the adhesive layer 26 facing downward is placed on the reinforcing cloth 42B and further the reinforcing cloth 42T (base cloth 44T) is placed over the reinforcing cloth 42C with the adhesive layer 26 facing downward. Depressing a heating plate of the heat press machine, locations of the no-cloth areas 46 and 50 and peripheries of the mounting holes 18 are heated under pressure, thus forming the adhesion areas 48 whereas the body cloth 41F and reinforcing cloth 42C are bonded together, the adhesion areas 52 where the body cloth 41F and the reinforcing cloth 42T are bonded together and further the adhesion areas 54 where the body cloth 41F and reinforcing cloth 42B are bonded together (FIGS. 17 and 18).

Thereafter, the inlet port 15 and mounting holes 18 are formed on the reinforced area RP (laminated area LP) by punching, thus completing the mount-side panel 14. Then, as in the first embodiment, the restraint panel 13 and mount-side panel 14 are joined together by outer peripheral edges 13a and 14a to complete the airbag 111, and the airbag 111 thus manufactured is assembled into the airbag apparatus M for a driver's seat for mounting on a steering wheel W. As shown in FIG. 13, creases CH and CV of the airbag 111 are also so formed as to avoid the adhesion areas 48, 52 and 54.

The airbag 111 of the second embodiment operates similarly to that of the first embodiment and attains similar advantageous effects to those of the first embodiment. In the second embodiment, the reinforcing cloths 42B, 42C and 42T are directly adhered to the body cloth 41F via the adhesion areas 48, 52 and 54.

In the second embodiment, too, the reinforcing cloth 42B acting as the first reinforcing cloth 221 is directly bonded to the body cloth 41F by annular adhesion areas 55 that are formed in circumferences 19 of the mounting holes 18. That is, the reinforcing cloth 42B is bonded to the body cloth 41F in such a manner as to double the base cloths in the circumferences 19 of the mounting holes 18 for reinforcement. This configuration enhances tensile strength of the circumferences 19 of the mounting holes 18 including the annular adhesion areas 55 and causes no raveling or tear in the circumferences 19 even in the event that a tension force acts on those areas in accordance with airbag inflation, thus allowing a smooth inflation of the airbag 111. As described in the first embodiment, when forming such annular adhesion areas like the areas 55, the body cloth 41F and the first reinforcing cloth 221 may be so adjacent that whole opposing planes contact each other as this embodiment.

Figure 19:
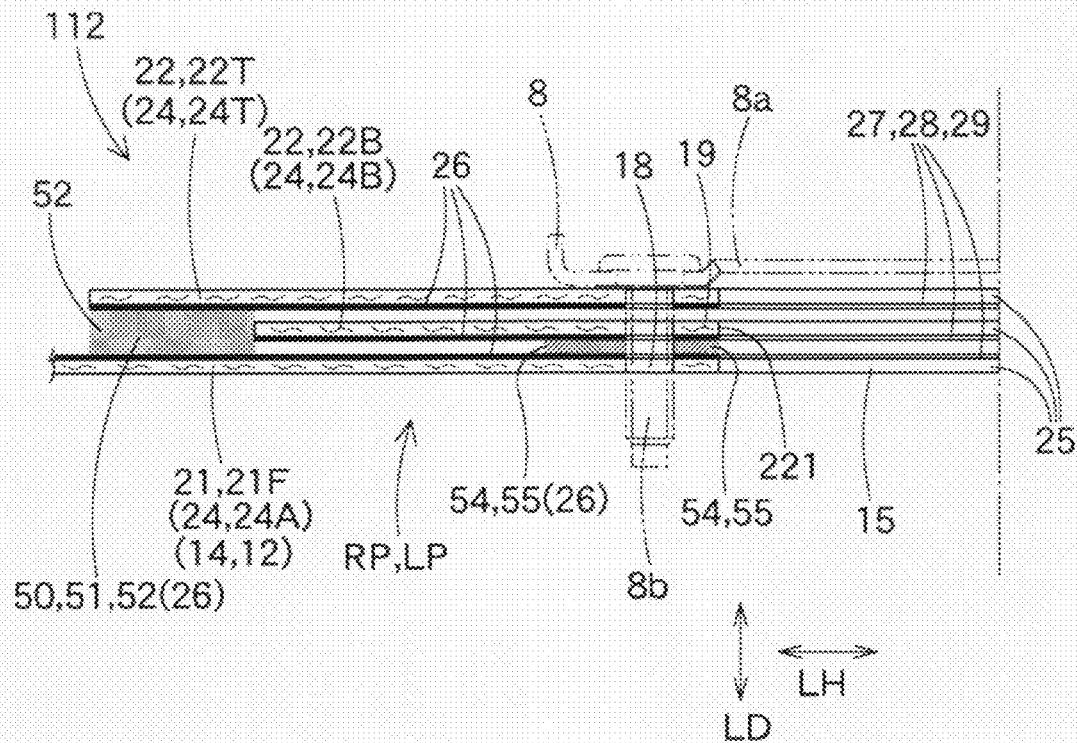
FIG. 19 is a vertical section of a vicinity of an inlet port of another embodiment.
Figure 20:
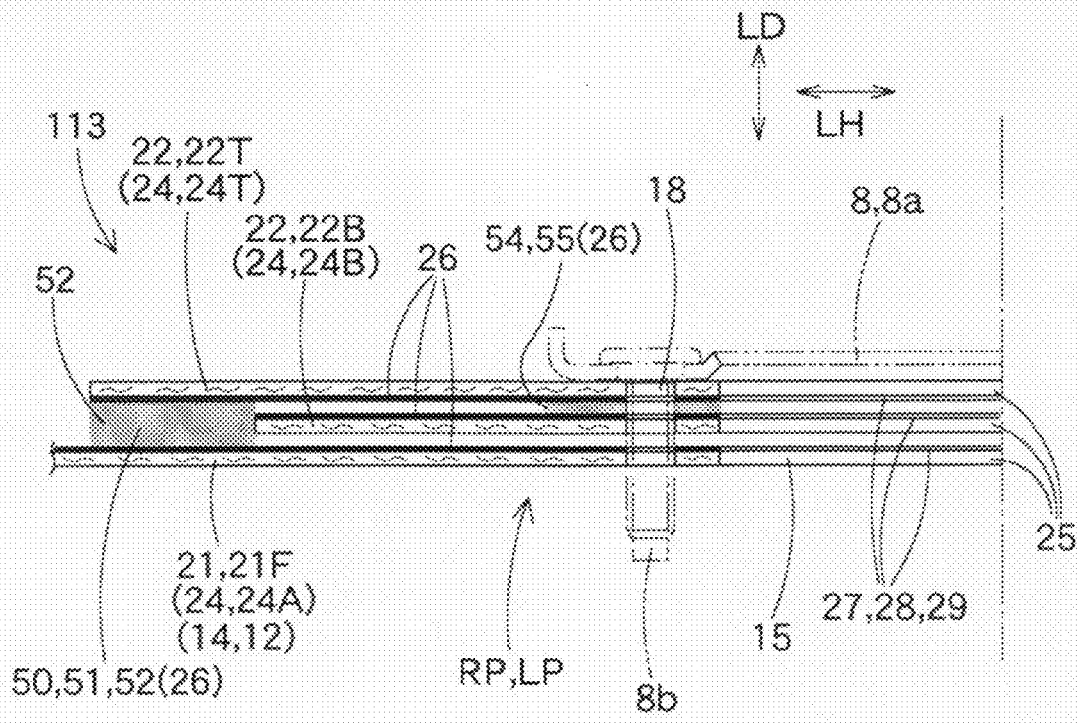
FIG. 20 is a vertical section of a vicinity of an inlet port of yet another embodiment.
Figure 21:
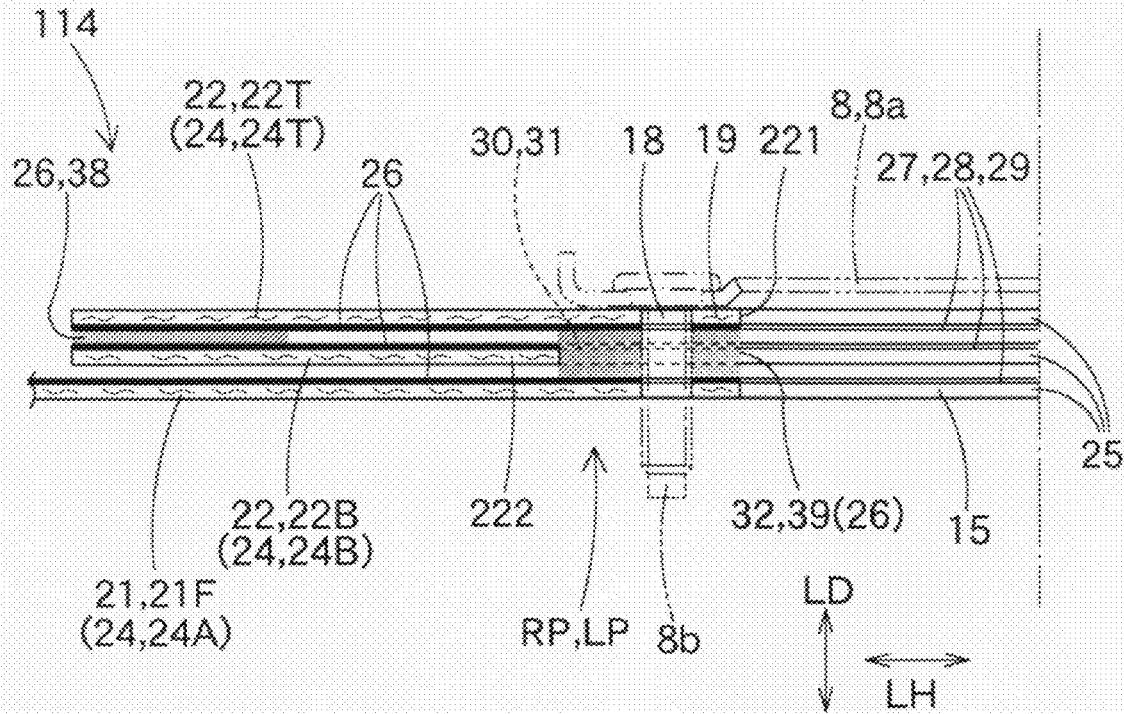
FIG. 21 is a vertical section of a vicinity of an inlet port of yet another embodiment.
Figure 22:
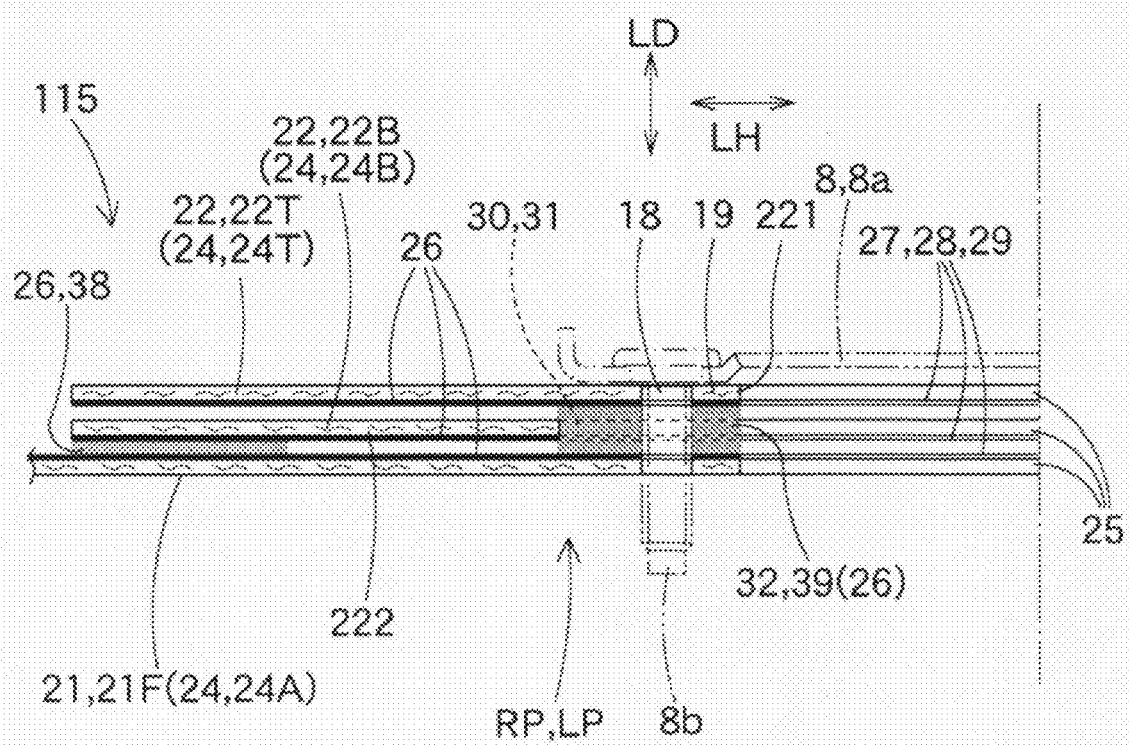
FIG. 22 is a vertical section of a vicinity of an inlet port of yet another embodiment.

In the first and second embodiments, each three sheets of the reinforcing cloths 22/42 are overlaid on the body cloth 21/41. Alternatively, as airbags 112, 113, 114 and 115 shown in FIGS. 19 to 22, the laminated area LP or reinforced area RP may be formed by laminating two sheets of reinforcing cloths 22 (22B, 22T) on the body cloth 21 so as to have a three-ply structure of base cloths 24 (24A, 24B and 24T). In these airbags 112, 113, 114 and 115, a body cloth 21 (base cloth 24A) located outmost and a reinforcing cloth 22T (base cloth 24T) farthest from the body cloth 21 are so arranged that their adhesive layers 26 oppose each other. In this case, as shown in FIGS. 19 and 20, the body cloth 21 and reinforcing cloth 22T may be bonded together at adhesion areas 52 that are formed utilizing outer spaces 51 of the reinforcing cloth 22B (or no-cloth areas 50) between the body cloth 21 and reinforcing cloth 22T. Alternatively, as shown in FIGS. 21 and 22, the body cloth 21 and reinforcing cloth 22T may be bonded together at adhesion areas 32 (annular adhesion areas 39) that are formed utilizing through holes 31 formed around the mounting holes 18 on the reinforcing cloth 22B (i.e. inner spaces or no-cloth areas 30).

The reinforcing cloth 22B (base cloth 24B) placed between the body cloth 21 and reinforcing cloth 22T may be suitably arranged with the adhesive layer 26 facing toward the body cloth 21 or reinforcing cloth 22T so as to be bonded to the body cloth 21 as shown in FIG. 19 or to the reinforcing cloth 22T as shown in FIG. 20 at the adhesion areas 54 (annular adhesion areas 55). Alternatively, the reinforcing cloth 22B (base cloth 24B) maybe suitably arranged with the adhesive layer 26 facing toward the body cloth 21 or reinforcing cloth 22T so as to be bonded to the reinforcing cloth 22T as shown in FIG. 21 or to the body cloth 21 as shown in FIG. 22 at the adhesion areas 38.

In the airbags 112, 114 and 115, one of the reinforcing cloths acts as the first reinforcing cloth 221 that is directly bonded to the body cloth 21 by the annular adhesion areas 55/39 that are formed in entire circumferences 19 of the mounting holes 18 and immediately around the mounting holes 18. That is, the first reinforcing cloth 221 is bonded to the body cloth 21 in such a manner as to double the base cloths in the circumferences 19 of the mounting holes 18 for reinforcement. This configuration enhances tensile strength of the circumferences 19 of the mounting holes 18 including the annular adhesion areas 55/39 and causes no raveling or tear in the circumferences 19 even in the event that a tension force acts on those areas in accordance with airbag inflation, thus allowing a smooth inflation of the airbag 112/114/115.

When forming such annular adhesion areas 55/39, the body cloth 21 and the first reinforcing cloth 221 may be arranged so adjacent that whole opposing planes of the cloths 21 and 221 contact each other as the airbag 112 shown in FIG. 19. Alternatively, the remaining reinforcing cloths 22B, namely the second reinforcing cloth 222 may be located between the body cloth 21 and the first reinforcing cloths 221 as in the airbag 114/115 shown in FIG. 21/22. The latter case will be arranged by providing the through holes 31 acting as the no-cloth areas 30 on the second reinforcing cloth 222 in such a manner as to enlarge the circumferences 19 of the mounting holes 18 so the body cloth 21 and first reinforcing cloth 221 are directly bonded together at the through holes 31 and form the annular adhesion areas 39.

Figure 23:
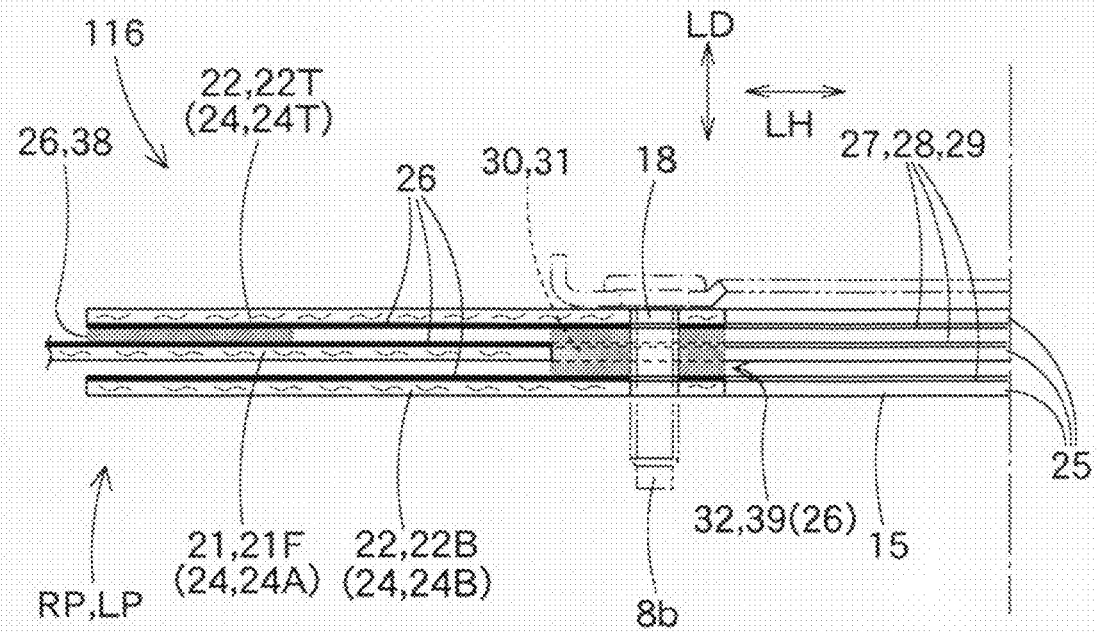
FIG. 23 is a vertical section of a vicinity of an inlet port of yet another embodiment.
Figure 24:
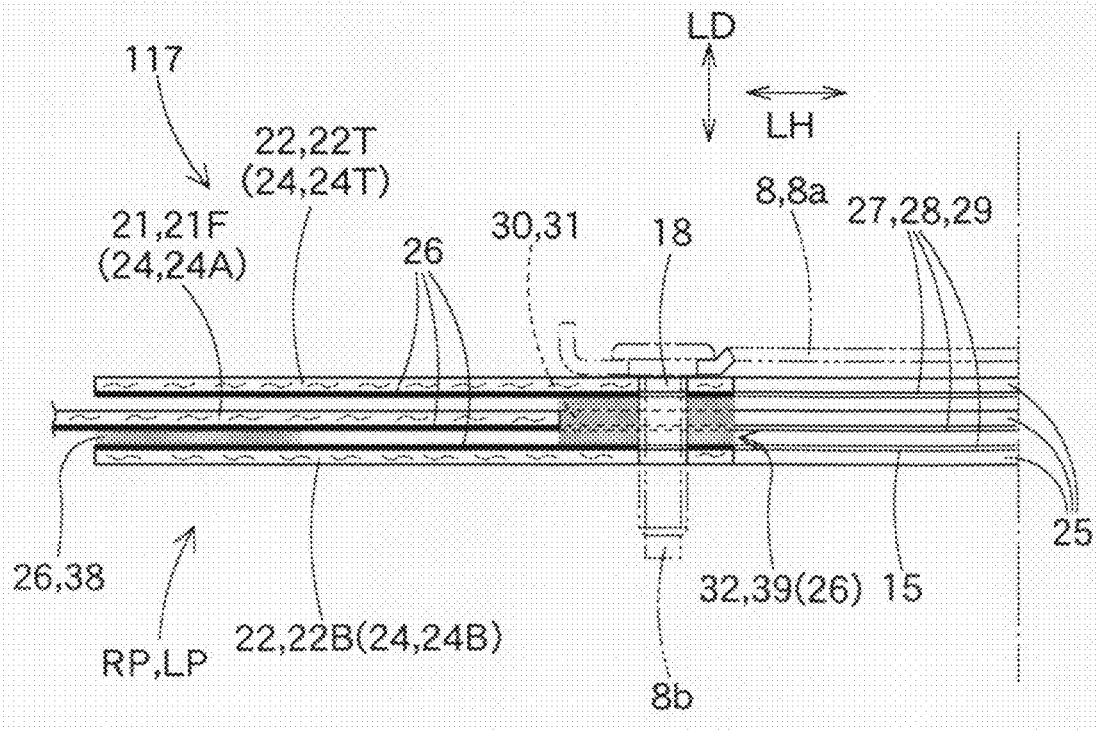
FIG. 24 is a vertical section of a vicinity of an inlet port of yet another embodiment.

When the reinforced area RP is formed by laminating the base cloths 24, the reinforcing cloth 22B may be located outside of the body cloth 21 as in airbags 116 and 117 shown in FIGS. 23 and 24. In the airbag 116 shown in FIG. 23, the body cloth 21 is arranged with the adhesive layer 26 facing inward for bonding with the adhesive layer 26 of the reinforcing cloth 22T. In the airbag 117 shown in FIG. 24, the body cloth 21 is arranged with the adhesive layer 26 facing outward for bonding with the adhesive layer 26 of the reinforcing cloth 22B. However, if the laminated area LP is formed on the inner surface of the body cloth 21/41 with more than one reinforcing cloths 22/42 as in the first and second embodiments, the reinforcing cloths 22/42 will protect the inner surface of the body cloth 21/41 from hot mists of inflation gas, i.e. improve the heat resistance of the body cloth 21/41 in comparison with the airbags 116 and 117.

Figure 25:
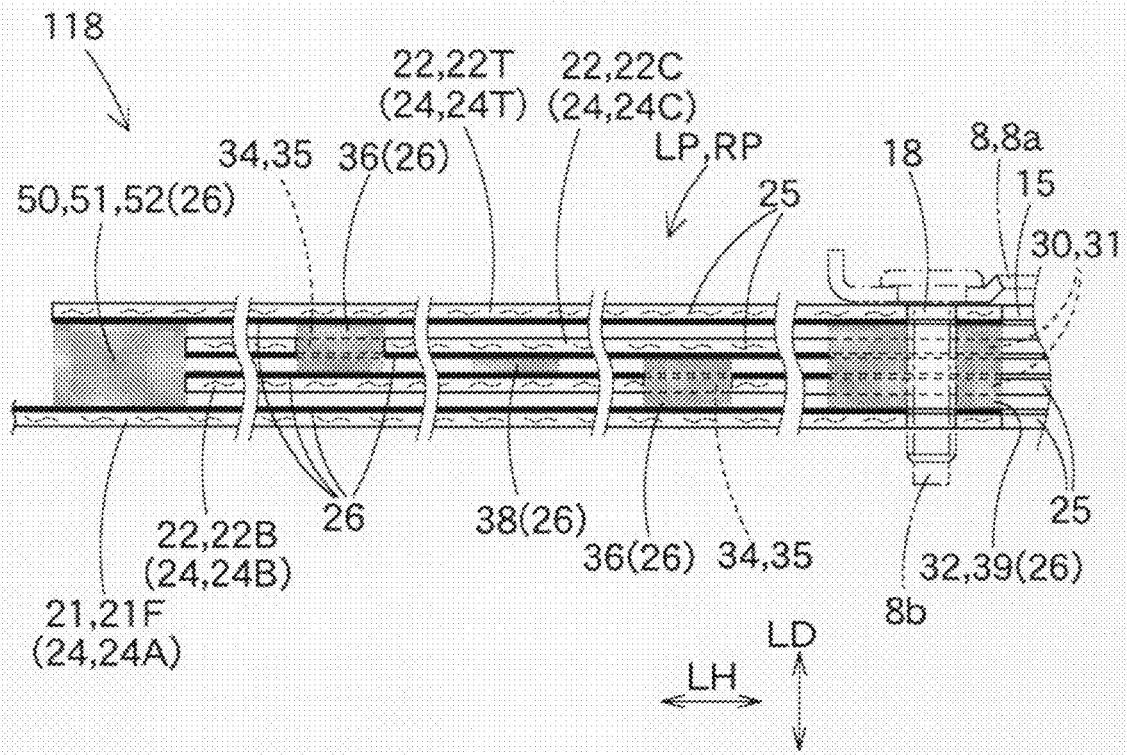
FIG. 25 is a vertical section of a vicinity of an inlet port of yet another embodiment.
Figure 26:
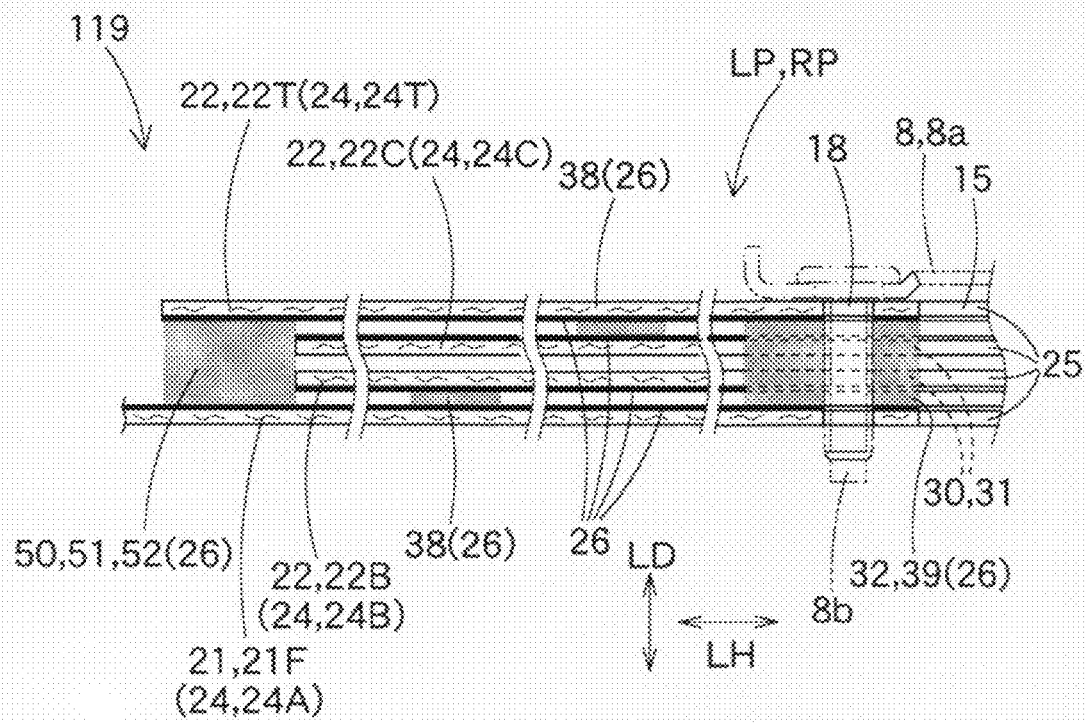
FIG. 26 is a vertical section of a vicinity of an inlet port of yet another embodiment.

Furthermore, referring to airbags 118 and 119 shown respectively in FIGS. 25 and 26, when the laminated area LP is formed to have a four-ply structure of the base cloths 24, the lowermost base cloth 24A and uppermost base cloth 24T are arranged such that adhesive layers 26 face each other whereas two remaining base cloths 24B and 24C placed there between may be arranged such that their adhesive layers 26 face each other as the airbag 118 shown in FIG. 25 or may alternatively be arranged such that the adhesive layers 26 face away from each other as the airbag 119 shown in FIG. 26. Further alternatively, the adhesive layers 26 of the base cloths 24B and 24C may be arranged to face toward the same direction as the airbag 111 shown in FIG. 18. In any of above cases all the base cloths 24 forming the laminated area LP may be bonded together without slippage from one another in a direction LH orthogonal to the layering direction LD by the adhesion areas 38 that adhere two adjoining sheets of the base cloth 24 together or by the adhesion areas 32, 36 and 52 that bond together a pair of base cloths 24 having at least one more base cloth 24 placed in between via the no-cloth areas 30, 34 and 50 formed on the base cloth 24 placed in between. The airbag 118 of FIG. 25 includes an adhesion area 38 between the adjoining base cloths 24B and 24C whereas the airbag 119 of FIG. 26 includes adhesion areas 38 between the adjoining base cloths 24A and 24B and in between the cloths 24C and 24T. The adhesion area 32 is formed between the base cloths 24A and 24T via the through holes 31 or no-cloth areas 30 formed on the base cloths 24B and 24C in the airbags 118 and 119 of FIG. 25 and 26. The adhesion areas 36 are formed on two locations in the airbag 118 of FIG. 25; between the base cloths 24B and 24T via the through hole 35 (no-cloth area 34) formed on the base cloth 24C and between the base cloths 24A and 24C via the through hole 35 (no-cloth area 34) formed on the base cloth 24B. Furthermore, the airbag 118/

119 includes the adhesion area 52 between the base cloths 24A and 24T via outer spaces 51 (no-cloth area 50) of the base cloths 24B and 24C.

Although all the adhesion areas are made at one time by a single operation of depressing a heating plate of the heat press machine in the first and second embodiments, such operation may be conducted each time a pair of the base cloths 24/44 is bonded together.

Although the foregoing embodiments have been described as used for the airbag apparatus M for a driver's seat, the present invention may be applied to various airbags for a front passenger's seat, for side impact, and for knee protection.

What is claimed is:

1. An airbag mountable on a vehicle comprising:
   a reinforced area for enhancing tensile strength on a circumferential wall of the airbag, the reinforced area being formed in a periphery of mounting holes for receiving means for mounting the airbag on a predetermined mounting location, wherein:
   the reinforced area has a laminated structure of base cloths each of which having a layer of adhesive only on one surface and includes in between the base cloths an adhesion area that bonds the base cloths together by heat sealing with the layers of adhesive of the base cloths applied face to face, the base cloths including a body cloth and at least two reinforcing cloths each of which being smaller in area than the body cloth;
   the adhesion area is formed between two of the base cloths immediately adjoining each other or between two of the base cloths that has at least one other base cloth placed in between and at an area of the other base cloth where there is no cloth, each of the layers of adhesive forming the adhesion area only when applied to each other immediately and heat sealed; and
   all the base cloths are bonded together by the adhesion area without slippage from one another in a direction orthogonal to a layering direction of the base cloths.

2. The airbag of claim 1, wherein the area where there is no cloth is comprised of a through hole formed on the other base cloth that is placed between the two base cloths adhered together.

3. The airbag of claim 1, wherein:
   the other base cloth placed between the two base cloths adhered together is smaller than the two base cloths;
   the adhesion area of the two base cloths is formed on an outer space of the other base cloth; and
   the area where there is no cloth is comprised of the outer space of the other base cloth.

4. The airbag of claim 1 wherein the reinforcing cloths are located on an inner surface of the body cloth.

5. The airbag of claim 1 wherein at least one of the reinforcing cloths is located on an outer surface of the body cloth.

6. The airbag of claim 1 wherein one of the reinforcing cloths acts as a first reinforcing cloth that is directly adhered to the body cloth by annular adhesion areas that are formed all around and immediately around the mounting holes.

7. The airbag of claim 6 wherein the body cloth and the first reinforcing cloth are immediately adjacent such that whole opposing planes thereof contact each other.

8. The airbag of claim 6 wherein:
   at least one of the reinforcing cloths is located between the body cloth and the first reinforcing cloth as a second reinforcing cloth; and
   the second reinforcing cloth includes around the mounting holes through holes that act as the areas where there is no cloth and form the annular adhesion areas where the body cloth and the first reinforcing cloth are directly bonded together.

9. The airbag of claim 1 wherein the adhesive is formed from polyamide elastomer and the base cloths are made of fabric of polyamide fiber.

10. The airbag of claim 9 wherein the base cloths are coated by a coating agent for reducing gas permeability made from the same material as the adhesive.

11. The airbag of claim 1, wherein:
    the reinforced area includes an inlet port of inflation gas;
    the mounting holes are arranged radially about and in a periphery of the inlet port inside the reinforced area; and
    in a view projected along the layering direction of the base cloths, the adhesion area of the base cloths is located on a position on the reinforced area that an annular retainer including the means for mounting to be inserted into the mounting holes holds down onto the predetermined mounting location.

12. The airbag of claim 1 wherein the adhesion area of the base cloths is located avoiding locations of creases that are formed to fold up the airbag.

* * * * *